(12) United States Patent
Kurimoto et al.

(10) Patent No.: US 8,649,075 B2
(45) Date of Patent: Feb. 11, 2014

(54) IMAGE READING APPARATUS AND CONTROL METHOD

(75) Inventors: Masami Kurimoto, Machida (JP); Yasuyuki Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 564 days.

(21) Appl. No.: 12/753,343

(22) Filed: Apr. 2, 2010

(65) Prior Publication Data

US 2010/0253985 A1 Oct. 7, 2010

(30) Foreign Application Priority Data

Apr. 6, 2009 (JP) ................................ 2009-091895

(51) Int. Cl.
H04N 1/46 (2006.01)
(52) U.S. Cl.
USPC ............ 358/505; 358/1.9; 358/523; 358/514; 358/482; 358/483; 250/208.1; 348/294
(58) Field of Classification Search
None
See application file for complete search history.

(56) References Cited

U.S. PATENT DOCUMENTS

| | | | | | |
|---|---|---|---|---|---|
| 5,210,410 | A | * | 5/1993 | Barrett | 250/234 |
| 5,440,406 | A | * | 8/1995 | Sugino | 358/444 |
| 5,963,344 | A | * | 10/1999 | Morita et al. | 358/482 |
| 6,031,638 | A | * | 2/2000 | Rao et al. | 358/474 |
| 6,081,687 | A | * | 6/2000 | Munemori et al. | 399/374 |
| 6,265,706 | B1 | * | 7/2001 | Oliver et al. | 250/208.1 |
| 6,532,083 | B1 | * | 3/2003 | Kitsutaka et al. | 358/474 |
| 6,621,598 | B1 | * | 9/2003 | Oda | 358/473 |
| 7,376,289 | B2 | * | 5/2008 | Tsumura et al. | 382/305 |
| 7,602,536 | B2 | * | 10/2009 | Takahashi | 358/474 |
| 7,817,297 | B2 | * | 10/2010 | Ushida et al. | 358/1.16 |
| 8,072,652 | B2 | * | 12/2011 | Yamada | 358/474 |
| 8,194,279 | B2 | * | 6/2012 | Ishikawa et al. | 358/1.18 |
| 2002/0131095 | A1 | * | 9/2002 | Koike | 358/516 |
| 2003/0038989 | A1 | * | 2/2003 | Yokota et al. | 358/474 |
| 2003/0202193 | A1 | * | 10/2003 | Yokochi | 358/1.9 |
| 2004/0012829 | A1 | * | 1/2004 | Takahashi | 358/474 |
| 2004/0012830 | A1 | * | 1/2004 | Yokochi | 358/474 |

(Continued)

FOREIGN PATENT DOCUMENTS

| | | |
|---|---|---|
| JP | 9-130592 A | 5/1997 |
| JP | 2004-220585 A | 8/2004 |
| JP | 2007-13595 A | 1/2007 |

OTHER PUBLICATIONS

David J. Kappos, Subject Matter Eligibility of Computer Readable Media, Feb. 23, 2010, US Patent and Trademark Office, 1351 OG 212.*

*Primary Examiner* — King Poon
*Assistant Examiner* — Ted Barnes
(74) *Attorney, Agent, or Firm* — Canon USA, Inc. IP Division

(57) ABSTRACT

An apparatus includes a contact image sensor (CIS) configured to parallelly output image signals of a plurality of pixels via a plurality of signal lines, an analog frontend (AFE) configured to serially output the image signals of the plurality of pixels output from the CIS by converting the image signal into a plurality pieces of pixel data, an input/output control circuit configured to add reading position information and reading color information to each of the plurality pieces of pixel data, and a direct memory access controller (DMAC) configured to transfer each of the plurality pieces of pixel data to a storage position corresponding to the reading position information and the reading color information such that the plurality pieces of pixel data is stored in consecutive storage positions in an external memory.

20 Claims, 24 Drawing Sheets

(56) References Cited

U.S. PATENT DOCUMENTS

| | | | |
|---|---|---|---|
| 2004/0047006 A1* | 3/2004 | Kato | 358/474 |
| 2004/0100661 A1* | 5/2004 | Tsumura et al. | 358/443 |
| 2005/0078339 A1* | 4/2005 | Hori | 358/445 |
| 2005/0094225 A1* | 5/2005 | Hu | 358/493 |
| 2005/0162708 A1* | 7/2005 | Takahashi | 358/471 |
| 2006/0072168 A1* | 4/2006 | Okano et al. | 358/482 |
| 2007/0002408 A1* | 1/2007 | Ikeno | 358/514 |
| 2007/0007435 A1* | 1/2007 | Yokochi | 250/208.1 |
| 2007/0285683 A1* | 12/2007 | Someya et al. | 358/1.9 |
| 2008/0136951 A1* | 6/2008 | Nishimoto | 348/294 |
| 2008/0204297 A1* | 8/2008 | Mizuta | 341/155 |
| 2009/0009618 A1* | 1/2009 | Hasegawa et al. | 348/222.1 |
| 2009/0080035 A1* | 3/2009 | Downs | 358/473 |
| 2010/0266197 A1* | 10/2010 | Whiting | 382/152 |
| 2011/0019064 A1* | 1/2011 | Stallinga | 348/340 |
| 2011/0096370 A1* | 4/2011 | Okamoto | 358/444 |

* cited by examiner

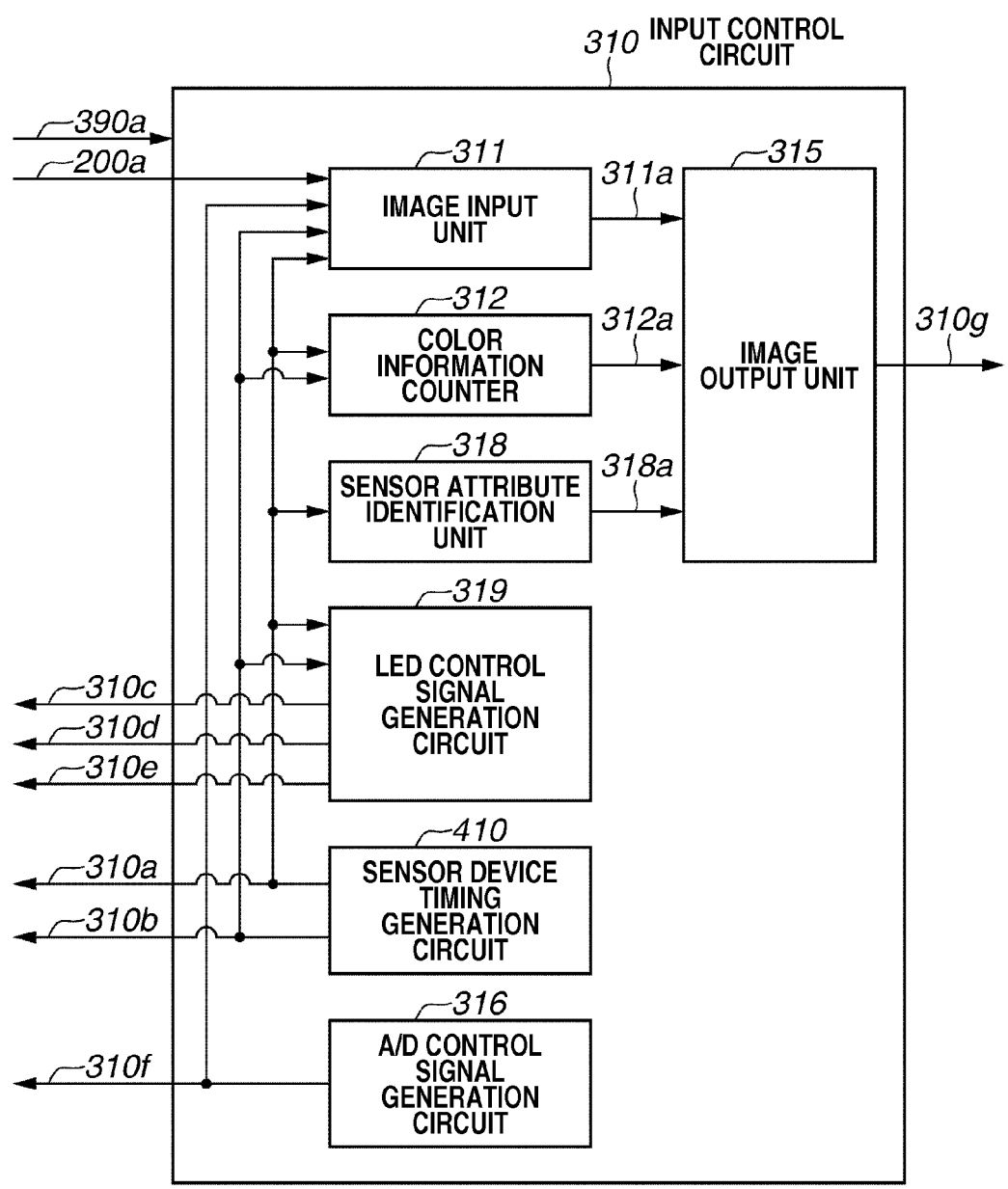

FIG.13A
| |
|---|
| READING OPERATION STARTING FLAG |
| SENSOR OFFSET |
| SENSOR Ch1 DATA OFFSET |
| SENSOR Ch1 EFFECTIVE PIXEL NUMBER |
| SENSOR Ch2 DATA OFFSET |
| SENSOR Ch2 EFFECTIVE PIXEL NUMBER |
| SENSOR Ch3 DATA OFFSET |
| SENSOR Ch3 EFFECTIVE PIXEL NUMBER |
~390a
FIG.13B
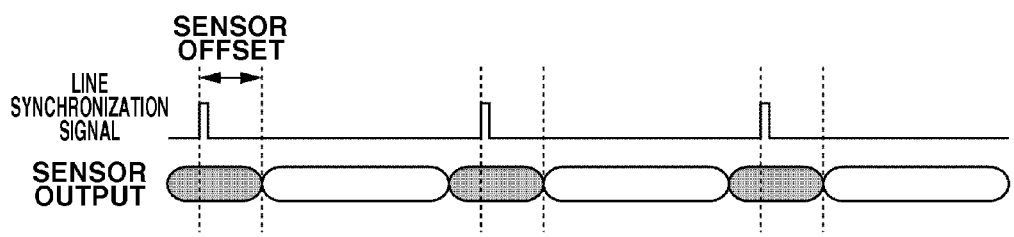
FIG.13C
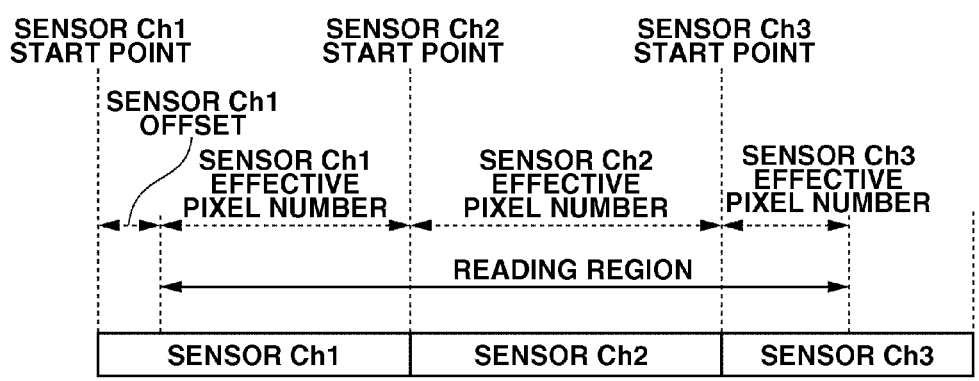

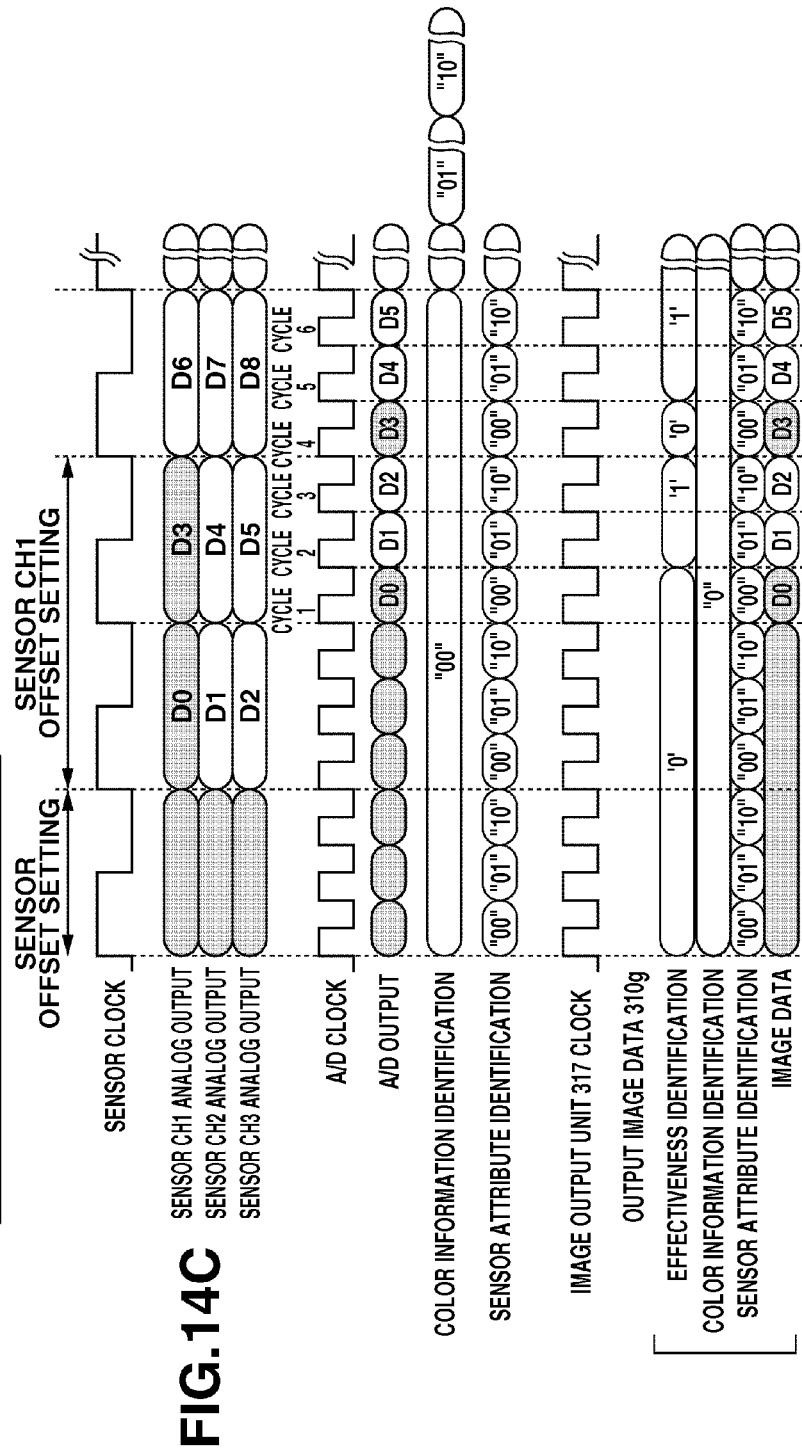

FIG.21A

| |
|---|
| READING OPERATION STARTING FLAG |
| SENSOR OFFSET |
| SENSOR Ch1 DATA OFFSET |
| SENSOR Ch1 EFFECTIVE PIXEL NUMBER |
| SENSOR Ch2 DATA OFFSET |
| SENSOR Ch2 EFFECTIVE PIXEL NUMBER |
| SENSOR Ch3 DATA OFFSET |
| SENSOR Ch3 EFFECTIVE PIXEL NUMBER |
| SENSOR Ch1 DUMMY PIXEL INSERTION |
| SENSOR Ch1 DUMMY PIXEL INSERTION POSITION |
| SENSOR Ch1 NUMBER OF DUMMY PIXELS |
| SENSOR Ch2 DUMMY PIXEL INSERTION |
| SENSOR Ch2 DUMMY PIXEL INSERTION POSITION |
| SENSOR Ch2 NUMBER OF DUMMY PIXELS |
| SENSOR Ch3 DUMMY PIXEL INSERTION |
| SENSOR Ch3 DUMMY PIXEL INSERTION POSITION |
| SENSOR Ch3 NUMBER OF DUMMY PIXELS |

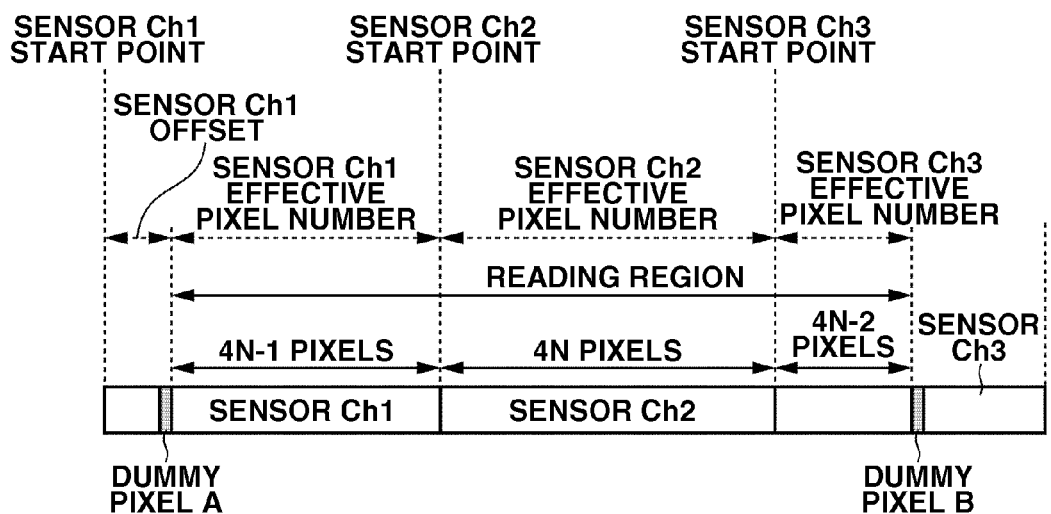

IMAGE READING APPARATUS AND CONTROL METHOD

BACKGROUND OF THE INVENTION

1. Field of the Invention

The present invention relates to an image reading apparatus and a control method.

2. Description of the Related Art

Conventionally, there are image reading apparatuses including a contact image sensor (CIS) as a reading device. The CIS is a sensor having a number of photoelectric conversion elements arranged in the main scanning direction. The number of photoelectric conversion elements corresponds to the number of pixels that are read. For example, if the direction of the short side of a document is considered as the main scanning direction, a CIS capable of reading an A4 size document has the photoelectric conversion elements for approximately 5100 pixels if the resolution is 600 dpi (dots per inch).

Image data for one line of a document read by such photoelectric conversion elements is converted photoelectrically, and then sequentially output in synchronization with a clock signal (hereinafter referred to as a sensor clock signal) input in the CIS. Thus, the time necessary in reading out one line of a document will be a time for which a number of transfer clock signals corresponding to the number of pixels are input in the CIS. In most cases, the transfer clock of the CIS is set to a low frequency (about 5 MHz) due to structural reasons. Thus, the CIS is generally used for reading apparatuses that operate at a relatively low speed.

Attempts for applying the CIS to high speed reading apparatuses are being proposed. For example, a reading apparatus that allows faster reading time by setting a plurality of photoelectric conversion elements arranged in a plurality of image reading regions in the main scanning direction as one element group and parallelly outputting image data from each element group has been proposed. In this case, if one line is divided into three in the main scanning direction, image data can be parallelly output from three element groups. Thus, the read out time of the image data will be one third of that for one line.

However, even if a CIS capable of parallel reading is used, rearrangement of the image data is necessary. This is because the image data needs rearrangement so that it is continuous in the main scanning direction. The rearrangement is performed by temporarily storing the image data, which is discontinuous in the main scanning direction, at an appropriate address of a storage medium, such as a memory, and then reading it out. The rearrangement is also performed by storing the input image data, which is discontinuous in the main scanning direction, in a storage medium, such as a memory, in the order the image data is input, and reading it out in such an order that the image data is continuous in the main scanning direction (e.g., Japanese Patent Application Laid-Open No. 2007-13595, Japanese Patent Application Laid-Open No. 9-130592, and Japanese Patent Application Laid-Open No. 2004-220585). However, if a storage medium such as a memory is necessary, it will raise the cost of the reading apparatus.

According to Japanese Patent Application Laid-Open No. 9-130592, rearrangement of the image data and image processing are performed by one memory in the reading apparatus so as to reduce the memory capacity necessary in rearranging the image data that is discontinuous in the main scanning direction. Further, Japanese Patent Application Laid-Open No. 2004-220585 discusses a technique that uses a storage medium, outside of an integrated circuit, having a relatively large capacity and rearranges the image data using a direct memory access controller (DMAC) before the image processing is performed by the reading apparatus.

However, each of the above-described conventional techniques requires a storage medium used for temporarily storing the image data that is discontinuous in the main scanning direction in rearranging the data. This raises the cost of the image reading apparatus.

SUMMARY OF THE INVENTION

According to an aspect of the present invention, an image reading apparatus including a plurality of image reading units includes a reading unit configured to parallelly output a signal of a plurality of pixels acquired by each image reading unit included in the plurality of image reading units via a plurality of signal lines corresponding to each image reading unit, an irradiation unit configured to irradiate a document by one of a plurality of light sources corresponding to a plurality of colors when the image reading unit reads the document, a conversion unit configured to convert the signal into a plurality pieces of pixel data, an output unit configured to convert the plurality pieces of pixel data into image data of one line and serially output the image data, an addition unit configured to add reading position information indicating a reading position in a main scanning line direction and reading color information indicating a color of an associated light source of the plurality of light sources to each of the plurality pieces of pixel data, an image processing unit configured to execute image processing corresponding to the reading position information and the reading color information, and a transfer unit configured to transfer each of the plurality pieces of pixel data to a storage position corresponding to the reading position information and the reading color information stored in consecutive storage positions in a storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 is a block diagram illustrating an input control circuit.

FIGS. 13A to 13C illustrate a configuration of a register, sensor output timing of the CIS, and an effective pixel instruction of each sensor channel.

FIGS. 14A to 14C illustrate output information of an image output unit.

FIGS. 21A and 21B illustrate a configuration of the register.

DESCRIPTION OF THE EMBODIMENTS

Various exemplary embodiments, features, and aspects of the invention will be described in detail below with reference to the drawings.

Figure 1:
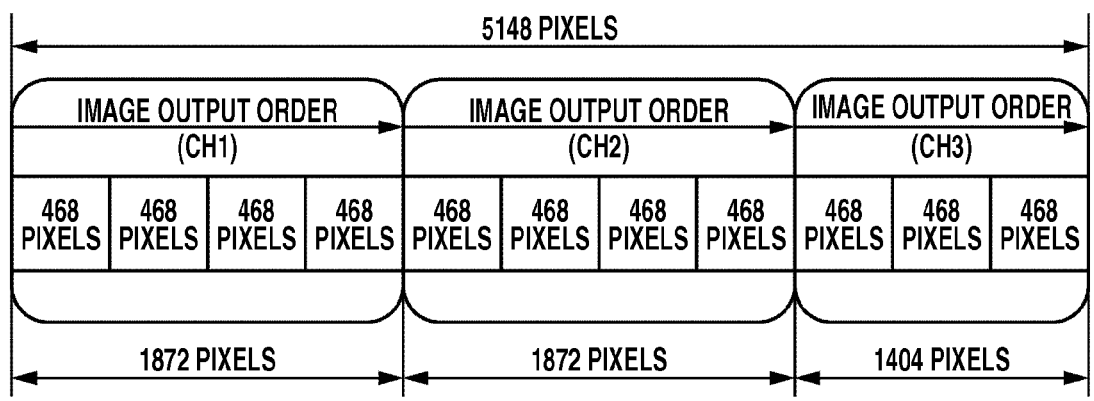
FIG. 1 illustrates an example of a configuration of a parallel output CIS.

FIG. 1 illustrates an example of a configuration of a parallel output CIS according to a first exemplary embodiment of the present invention. As illustrated in FIG. 1, the CIS of the present embodiment includes eleven photoelectric conversion element groups (image reading units) arranged in the main scanning direction. Each photoelectric conversion element group is capable of reading 468 pixels. Accordingly, the CIS is a line image sensor capable of reading a total number of 5148 pixels.

In order to reduce the output time of the data that is read, the eleven photoelectric conversion element groups are divided into three blocks. Two blocks include four photoelectric conversion element groups and one block includes three photoelectric conversion element groups. Thus, the CIS can parallelly output three channels at the same time. In the following description, the left block in FIG. 1 is referred to as a sensor channel 1 (sensor Ch1), the central block is referred to as a sensor channel 2 (sensor Ch2), and the right block is referred to as a sensor channel 3 (sensor Ch3).

The configuration of the CIS is not limited to what is described above and the number of the blocks of the photoelectric conversion element groups and the number of the channels can be changed from those described above.

As illustrated in FIG. 1, each of the sensor Ch1 and the sensor Ch2 includes 1872 pixels (468 pixels×4) each and the sensor Ch3 includes 1404 pixel (468 pixels×3).

An output line (not shown) used for outputting an image signal from a photoelectric conversion element is provided for each of the sensor channels 1, 2, and 3. When a line trigger signal SP is input in the CIS, a charge is transferred from each photoelectric conversion element to an analog shift register. Then, in synchronization with a clock signal CLK, which is provided after the line trigger signal SP, an analog image signal is output from each of the channels.

Analog image signals of the sensor channels 1, 2, and 3 are output from the three output lines provided for each of the sensor channels 1, 2, and 3.

Image signals from the first pixel to the 1872nd pixel are sequentially output from the sensor Ch1. Similarly, image signals from the 1873rd pixel to the 3744th pixel are sequentially output from the sensor Ch2, and image signals from the 3745th pixel to the 5148th pixel are sequentially output from the sensor Ch3.

Thus, the CIS illustrated in FIG. 1 is an image reading device including a plurality of photoelectric conversion elements arranged in a plurality of image scanning regions in the main scanning line direction in which the document is scanned, and parallelly outputs a plurality pieces of image data which the photoelectric conversion elements has obtained.

Figure 2:
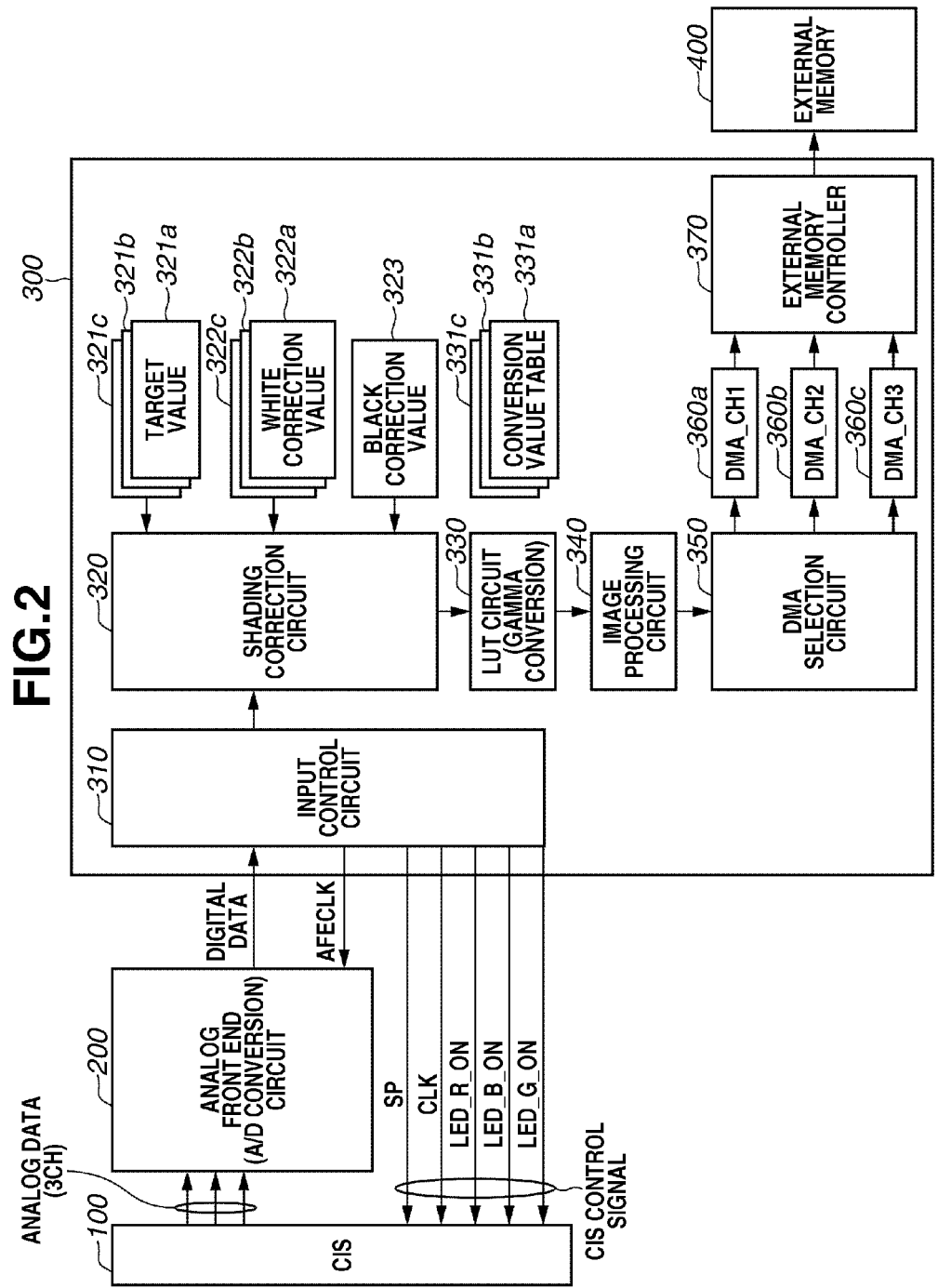
FIG. 2 is a block diagram illustrating a configuration of a reading apparatus.

FIG. 2 is a block diagram illustrating a configuration of the reading apparatus according to the present exemplary embodiment. In FIG. 2, the CIS 100 is configured as illustrated in FIG. 1. On receiving a CIS control signal, the CIS 100 parallelly outputs analog electric signals according to the light intensity of the image that it has read.

An analog frontend circuit (AFE) 200 receives the analog image data parallelly output from the CIS and converts the analog image data into digitized (A/D converted) image data. Further, the AFE 200 includes a function to serialize the image data that is parallelly input in the AFE 200 and outputs serialized image data.

A reading control circuit 300 controls the CIS 100 and the AFE 200. Further, the reading control circuit 300 processes the image data output from the AFE 200. The reading control circuit 300 includes an input control circuit 310, which generates the CIS control signal and controls timing of the CIS. Further, the input control circuit 310 changes the format of the image data sent from the AFE 200 into a predetermined format and transfers the image data to a processing circuit of the subsequent stage.

A shading correction circuit 320 performs shading correction of image data. The shading correction is used for setting image data, which is read, within a dynamic range of a target. The processing expressed in equation (1) is performed by the shading correction circuit 320.

$$Dshd = Dtarget \times (Din - Ddark)/Dwhite \quad (1)$$

Dshd: shading output
Dtarget: target value
Din: read-out image data
Ddark: black correction value
Dwhite: white correction value The Dtarget is a target value. Since the Dtarget is set for each of light sources R, G, and B, its value is stored in a memory 321a (for light source R), a memory 321b (for light source G), and a memory 321c (for light source B).

The Ddark is a black correction value used for matching a black reference level of the image data. A value of each pixel which is read when the light source is turned off is stored in a memory 323. The black correction value varies depending on the pixel position since the photoelectric conversion element of each pixel varies.

The Dwhite is a white correction value used for matching a white reference level of the image data. The white correction value is obtained by sequentially turning on each of the light sources R, G, and B, reading white reference data (white board), and subtracting the black correction value (Ddark) from the obtained value. Since the Dwhite varies depending on the light source and also on the pixel position, it is stored in a memory 322a (for light source R), a memory 322b (for light source G), and a memory 322c (for light source B).

A LUT (look-up table) circuit 330 performs gamma conversion. The LUT circuit 330 performs data conversion by referring to a conversion table memory 331a (for light source R), a conversion table memory 331b (for light source G), and a conversion table memory 331c (for light source B) provided for each of the light sources. An image processing circuit 340 performs image processing such as resolution conversion.

A DMA selection circuit 350 selects a DMA_CH1 (360a), a DMA_CH2 (360b), or a DMA_CH3 (360c) so that sorting of the image data output from the AFE 200 is performed by an external memory 400. An external memory controller 370 controls reading/writing of the external memory 400 on receiving a request from each DMA or from another master (not shown).

Figure 3:
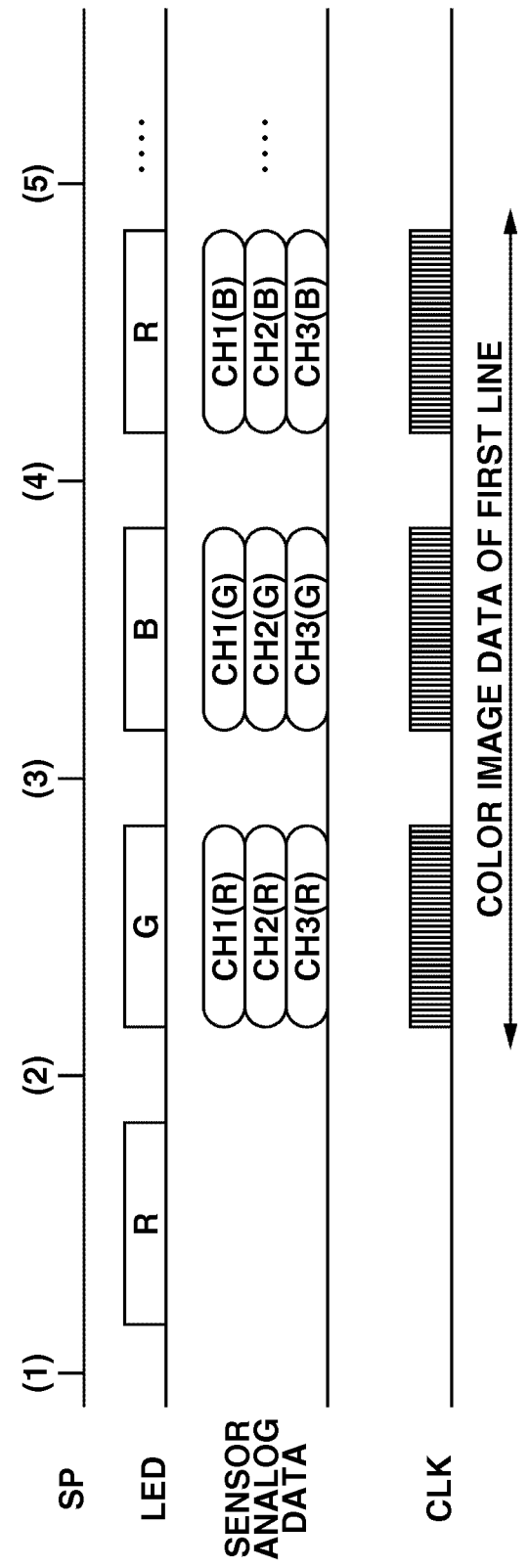
FIG. 3 illustrates data output from the CIS.

Next, reading operation of a color document performed by the reading apparatus of the present invention configured as described above will be described in detail. FIG. 3 illustrates lighting of each of the light sources when the reading is performed and data output from the CIS 100. As illustrated in FIG. 3, when the reading is started, the CIS 100 turns on a light-emitting diode (LED) of the R light source in synchronization with a line trigger signal SP (1). A sensor receives the light emitted from the R light source and each photoelectric conversion element accumulates a charge according to the light intensity of the received light.

Next, the CIS 100 turns on the LED of the G light source in synchronization with the output of a line trigger signal SP (2). At the same time, according to the output of the line trigger signal SP (2), the CIS 100 transfers a charge to an analog shift register connected to each of the photoelectric conversion elements.

By supplying the clock signal CLK to the CIS 100 while the G light source is turned on, the image data read by the R light source is output in synchronization with the clock signal CLK.

Next, an LED of a B light source is turned on in synchronization with the output of a line trigger signal SP (3). At this time, the image data read by the G light source is being output. Next, the reading of the second line is started. The reading process of the second line is similar to that of the first line. Thus, the R light source is turned on in synchronization with the output of a line trigger signal SP (4) and image data read by the B light source is output. In this way, color image data of one line is output. By repeating this process a number of times that corresponds to the number of lines of the document, reading of a color document is completed.

Figure 4:
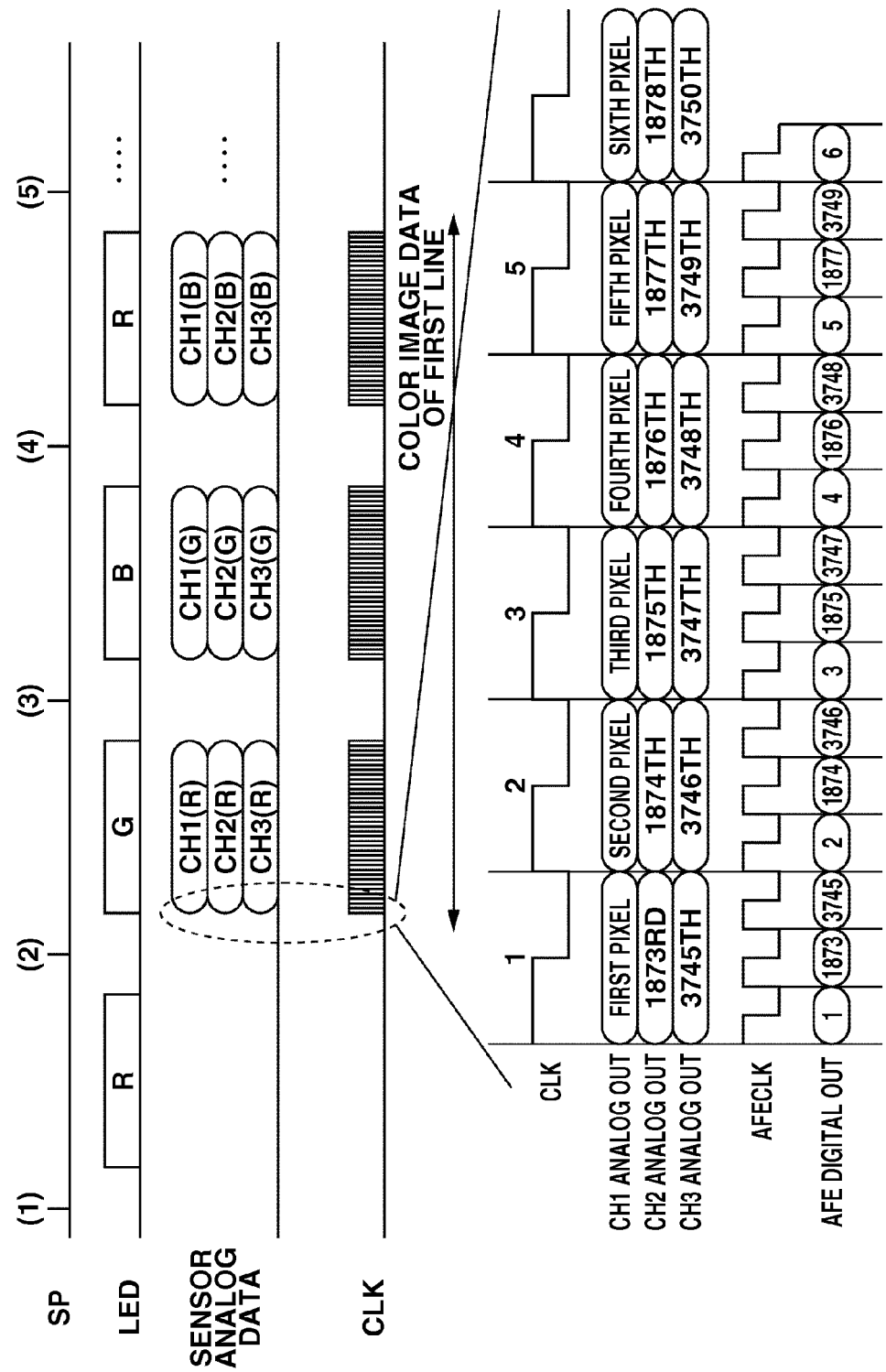
FIG. 4 illustrates digitization and serialization of analog data.

FIG. 4 illustrates digitization and serialization of analog data parallelly output from the CIS 100. This processing is performed by the AFE 200. As illustrated in FIG. 4, according to a first clock signal CLK supplied to the CIS 100, an image signal of the first pixel is output from the sensor channel 1 in parallel with an image signal of the 1873rd pixel output from the sensor channel 2 and an image signal of the 3745th pixel output from the channel 3. The "CH1 analog out" indicates an image output from the sensor channel 1, the "CH2 analog out" indicates an image output from the sensor channel 2, and the "CH3 analog out" indicates an image output from the sensor channel 3.

Subsequently, according to a second clock signal CLK supplied to the CIS 100, an image signal of a second pixel is output from the channel 1 in parallel with an image signal of a 1874th pixel output from the channel 2 and an image signal of a 3746th pixel output from the channel 3. In this way, according to each clock signal CLK supplied to the CIS 100, image signals are parallelly and sequentially output from the three channels. This process is repeated until the output of image signals of one line is completed.

While the clock signals CLK are supplied to the CIS 100, a clock signal AFECLK is supplied to the AFE 200. The AFE 200 outputs digitized image data in synchronization with the clock signal AFECLK.

According to the present embodiment, since the CIS 100 has parallel outputs for three channels, the relation of frequency ratio regarding the clock signal CLK supplied to the CIS 100 and the clock signal AFECLK supplied to the AFE 200 will be CLK:AFECLK=1:3.

The AFE 200 digitizes the data sent from the CIS 100. Further, the AFE 200 sequentially and serially outputs image data in the order of the sensor channel 1, the sensor channel 2, and the sensor channel 3 such as "the first pixel→the 1873rd pixel→the 3745th pixel→the second pixel→the 1874th pixel→the 3746th pixel→ . . . " in synchronization with the clock signal AFECLK. AFE digital out illustrated in FIG. 4 is image data serially output from the AFE 200.

Figure 5:
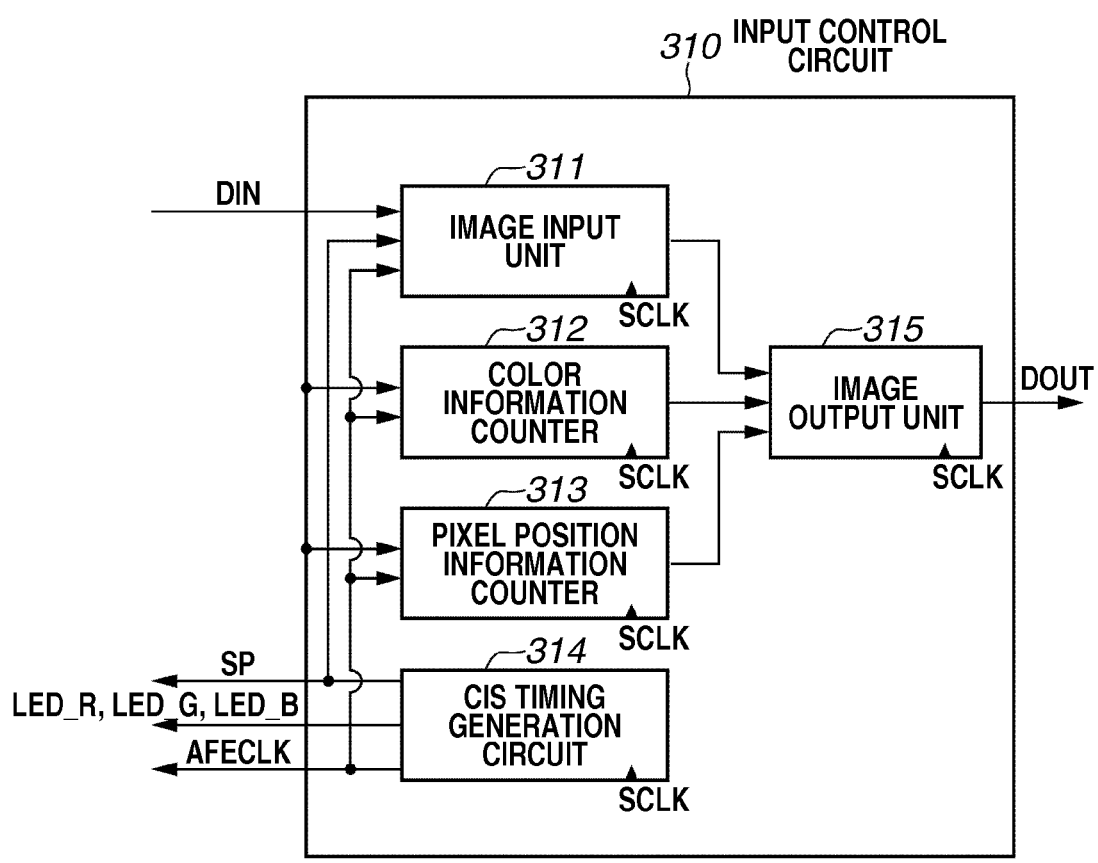
FIG. 5 is a block diagram illustrating an input control circuit.

FIG. 5 is a block diagram illustrating the input control circuit 310 that controls input of the image data output from the AFE 200. In FIG. 5, an image input unit 311 receives data (DIN (i.e., AFE digital out in FIG. 4)) output from the AFE 200 and performs sampling in synchronization with an internal clock signal SCLK.

A CIS timing generation circuit 314 generates control signals used for controlling the CIS 100 and the AFE 200. A color information counter 312 is a counter that manages image data according to the light source of the image data (R, G, or B).

The color information counter 312 operates according to the line synchronization signal SP and is configured such that a 2-bit signal transits as "00 (R)→01 (G)→10 (B)→00 (R)→ . . . ". In other words, the color information counter 312 is a reading color information generation unit that generates reading color information indicating a color read by the CIS 100 from a plurality pieces of pixel data included in the image data of one line according to the line synchronization signal SP.

A pixel position information counter 313 manages a pixel position of discontinuous pixel data that is input such as "the first pixel→the 1873rd pixel→the 3745th pixel→the second pixel→the 1874th pixel→the 3746th pixel→ . . . ".

The pixel position information counter 313 counts up the pixel position of each sensor channel according to a sampling signal SMPLP generated from the clock signal AFECLK, and is cleared according to the line synchronization signal SP. In other words, the pixel position information counter 313 is a reading position information generation unit that generates reading position information indicating a pixel position (reading position of the pixel data by the CIS 100) according to the clock signal AFECLK (one-third the frequency of the clock signal CLK of the CIS 100).

Figure 6:
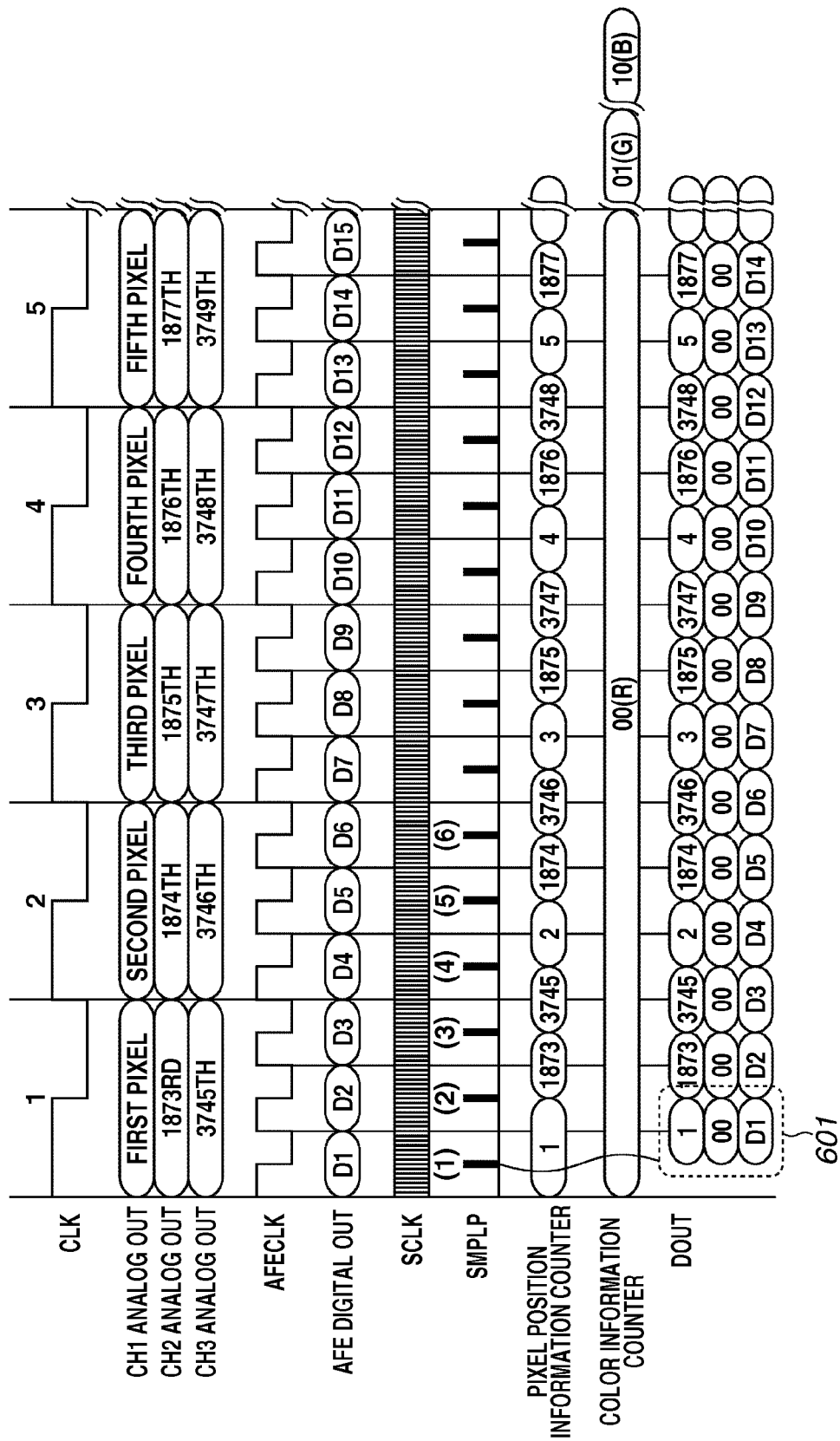
FIG. 6 is a timing chart illustrating an operation of an input control circuit.

An image output unit 315 merges the pixel data obtained from the image input unit 311, the color information counter value obtained from the color information counter 312, and the pixel position information counter value obtained from the pixel position information counter 313, and outputs the merged value as DOUT (see FIG. 6). In other words, the image output unit 315 adds the color information counter value obtained from the color information counter 312 and the pixel position information counter value obtained from the pixel position information counter 313 to the pixel data obtained from the image input unit 311 and outputs the obtained result.

FIG. 6 is a timing chart illustrating an operation of the input control circuit 310. Sampling of image signals (DIN (AFE digital out)) of each of the sensor channels 1, 2, and 3, which is serialized by the AFE 200, is performed by the image input unit 311 according to the sampling signal SMPLP. The sampling signal SMPLP is generated according to the clock signal AFECLK.

More specifically, the image signals of the first pixel, the 1873rd pixel, and the 3745th pixel, which have been parallelly output from the sensor channels 1, 2, and 3 according to the first clock signal CLK, are serially output in the order of the sensor channel 1, sensor channel 2, and sensor channel 3 such as D1, D2, and D3 from an analog frontend.

Sampling of the signals is performed according to the sampling signal SMPLP described above and the sampling-completed signals are output as DOUT after the pixel position information counter value and the color information counter value are added. Data which is output according to a first sampling signal SMPLP (1) is data 601 which is pixel position information (first pixel)+color information (00:R)+D1. The signals are simultaneously output from parallel lines.

Next, "pixel position information (1873rd pixel)+color information (00:R)+D2" is output according to a second sampling signal SMPLP (2), and similar input/output operations are repeated until the input of image data corresponding to one line when the light source R is turned on is completed. Then, similar operations are repeated for the light sources G and B, and such operations are repeated until the number of lines reaches the number of the lines to be read of the document.

The pixel position information counter 313 counts up the pixels such as the first pixel→the 1873rd pixel→the 3745th pixel→the second pixel→the 1874th pixel→the 3746th pixel→ . . . so that the pixel position of each channel is determined for each sampling signal SMPLP. The pixel position information counter 313 is cleared by the line synchronization signal SP.

On the other hand, the color information counter 312 operates according to the line synchronization signal SP and counts up the color information in 2-bit signals such as "00 (R)→01 (G)→10 (B)→00 (R)→ . . . ".

When the shading correction circuit 320 receives the output (DOUT) from the input control circuit 310 in the preceding stage, the operation described below starts. The case described below is where the data which is described above referring to FIG. 6 is input in the shading correction circuit 320.

As the first input data, the data 601, which includes the image position information (first pixel), the color information (00:R), and the pixel data (D1), is input. The input data is referred to as Din. Since the color information is "00 (R)", the shading correction circuit 320 selects a value stored in the memory 321a (R target) (see FIG. 2) as a target value. The obtained value is the Dtarget. Next, the shading correction circuit 320 selects a value stored in the memory 322a (R white correction) as the white correction value (see FIG. 2).

Next, the shading correction circuit 320 converts the pixel position information being the first pixel into an address, and then reads out a white correction value from the memory 322a (see FIG. 2). The obtained white correction value is regarded as the Dwhite. Similarly, the shading correction circuit 320 reads out a black correction value from the memory 323 (see FIG. 2). The obtained black correction value is regarded as the Ddark. Next, the shading correction circuit 320 performs the shading correction using the result of the calculation obtained from the above-described equation (1), adds the pixel position information and the color information to the result of the calculation, and outputs the obtained result to the LUT circuit 330.

The LUT circuit 330 receives the data output from the shading correction circuit 320 and determines the color information included in the data. Since the color information is 00 (R), the LUT circuit 330 selects the conversion value table 331a for the light source R (see FIG. 2). The LUT circuit 330 treats the pixel data that has undergone the shading correction as an address, and by reading out the converted value stored in the conversion value table 331a, it obtains a gamma-converted value. Then the LUT circuit 330 adds the pixel position information and the color information to the gamma-converted value and outputs the obtained result to the image processing circuit 340.

The image processing circuit 340 receives the data output from the LUT circuit 330 and after performing data processing such as resolution conversion, it outputs the data with only the pixel position information added to the DMA selection circuit 350.

The DMA selection circuit 350 receives the data output from the image processing circuit 340 and analyzes the pixel position information. According to the result of the analysis, if the DMA selection circuit 350 determines that the pixel of the analyzed information corresponds to the sensor channel 1, it selects the DMA_CH1 (360a) (see FIG. 2) and sends a request to the external memory controller 370. Similarly, if the DMA selection circuit 350 determines that the pixel of the analyzed information corresponds to the sensor channel 2, it selects the DMA_CH2 (360b). Further, if the DMA selection circuit 350 determines that the pixel of the analyzed information corresponds to the sensor channel 3, it selects the DMA_CH3 (360c). Then, the DMA selection circuit 350 sends a request to the external memory controller 370.

Figure 7:
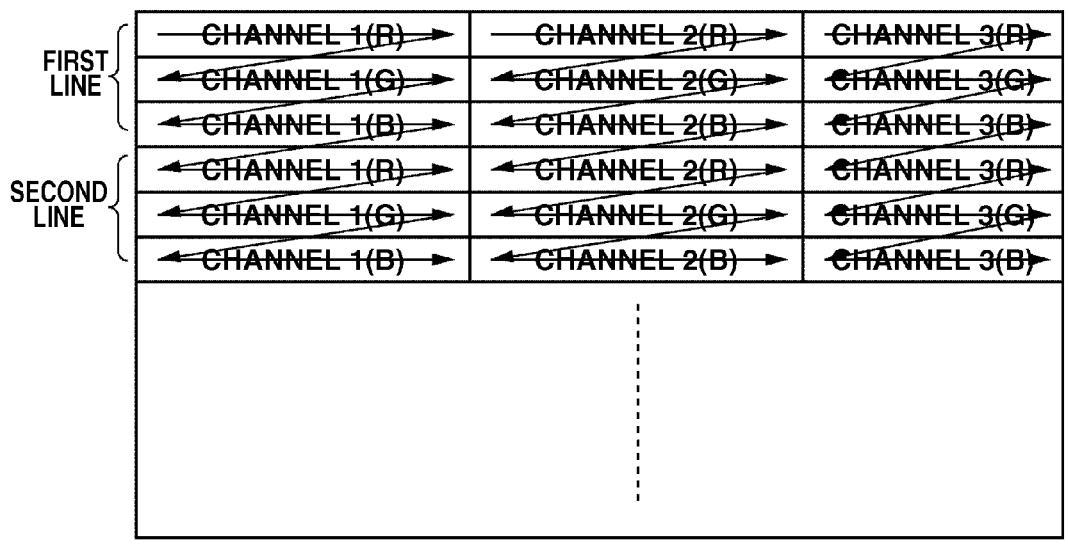
FIG. 7 illustrates a storage state of image data.

On receiving the request, the external memory controller 370 stores the pixel data that corresponds to each of the sensor channels 1 to 3 (Ch1 to Ch3) of the CIS 100 in the external memory 400 in units of lines (details are illustrated in FIG. 7). Thus, the DMA selection circuit 350 is a storage control unit that performs control so that the pixel data, which is processed by the image processing circuit 340, is stored in a storage position of the external memory 400 according to the reading position information added to the pixel data.

FIG. 7 illustrates an example of a storage state of the image data of each channel in the external memory 400 after the image data has undergone the operations described above according to the present embodiment. In FIG. 7, the arrows indicate the writing operation of the DMA of each channel.

As illustrated in FIG. 7, the image data of each of the sensor channels 1 to 3 (Ch1 to Ch3) of the CIS 100 can be rearranged in units of lines in a main memory (the external memory 400). In other words, an image of one line can be formed in the memory from image data that has not been input in the pixel order in the main scanning direction.

As describe above, according to the present embodiment, the input control circuit 310 adds the reading position information and the reading color information to each pixel data included in the image data output serially from the AFE 200. In this way, image data processing by the image processing units in the downstream (the shading correction circuit 320, the LUT circuit 330, the image processing circuit 340, etc.) can be simplified. For example, generation of the image position information in the shading correction circuit 320 is unnecessary. Further, generation of the image color information in the LUT circuit 330 is unnecessary.

Further, according to the present embodiment, since image data can be rearranged and stored in the external memory 400 without using a static random access memory (SRAM), it contributes to maintaining the cost of the image reading apparatus at a low level.

According to the image reading apparatus of the present embodiment, even if a CIS capable of parallel output is used, a unit that can rearrange the pixels in the main memory without a line buffer used for rearranging pixels is provided. As a result, a high-speed and low-cost image reading apparatus can be realized.

Next, a second exemplary embodiment of the present invention will be described.

According to the first exemplary embodiment, all the pixel data of a plurality of pixels (5148 pixels) output from all the photoelectric conversion elements in the CIS 100 is regarded as effective pixel data. According to the second exemplary embodiment, pixel data of only a part of the pixels (5148 pixels) is regarded as the effective pixel data.

Figure 8:
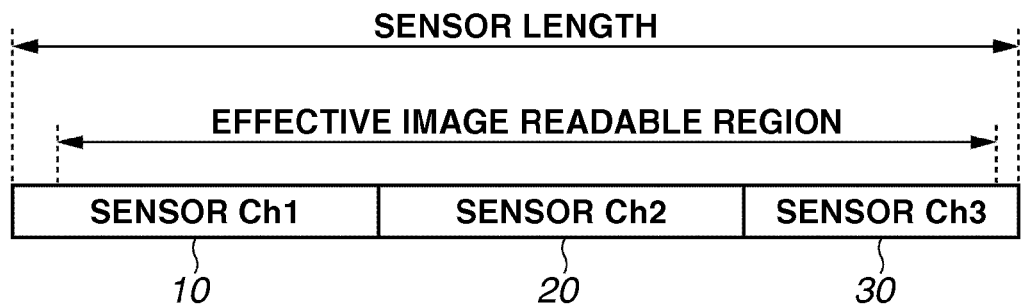
FIG. 8 illustrates an effective image readable region of the CIS.

FIG. 8 illustrates an effective image readable region of the CIS 100 illustrated in FIG. 1.

As illustrated in FIG. 1, the CIS 100 includes eleven photoelectric conversion element groups divided into three blocks. Two blocks include four photoelectric conversion element groups and one block includes three photoelectric conversion element groups. Although pixel data after the photoelectric conversion can be output from the left end region of the sensor Ch1 and the right end region of the sensor Ch3, the pixel data output from these regions is not effective.

Accordingly, the effective image readable region is the region excluding the left end region of the sensor Ch1 and the right end region of the sensor Ch3.

Figure 9A:
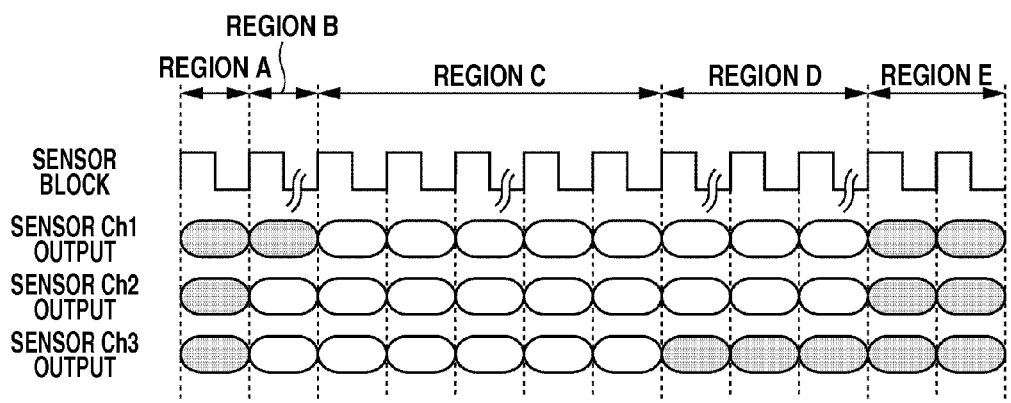
FIGS. 9A and 9B illustrate image data of the effective image readable region and an ineffective image readable region.

FIG. 9A illustrates the pixel data of the effective image readable region and the pixel data of regions other than the effective image readable region out of the image data output from the CIS 100. In FIG. 9A, a sensor clock is a clock signal input in the CIS 100.

In FIG. 9A, regions A and E are where the analog output signal output from any sensor channel of the CIS 100 is ineffective, in other words, the regions where effective pixel data is not output from the photoelectric conversion elements of the CIS 100.

In FIG. 9A, the shaded area in a region B is where the pixel data from the photoelectric conversion elements in the left end region of the sensor Ch1 is output. Further, a region C is where the pixel data from the photoelectric conversion elements of the effective image readable region illustrated in FIG. 8 is output. Further, the shaded area in a region D is where the pixel data from the photoelectric conversion elements in the right end region of the sensor Ch3 is output.

Although the effective image readable region is the region other than the ineffective image readable regions (the left end region of the sensor Ch1 and the right end region of the sensor Ch3) according to the description above, it is not limited to such forms.

For example, in order to enlarge the image data that is read, a certain region of a region of a total of 5148 pixels can be set as the effective image readable region.

Figure 9B:
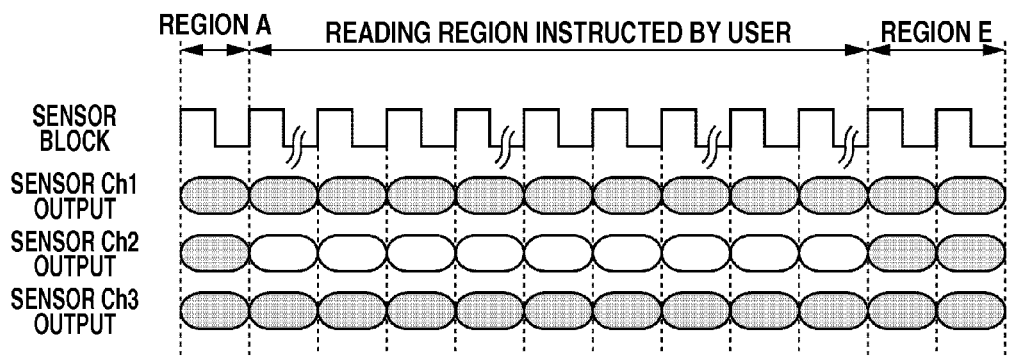

For example, as illustrated in FIG. 9B, if the region of the four photoelectric conversion element groups corresponding to the sensor Ch2 is the effective image readable region, the region of the photoelectric conversion elements corresponding to the sensor Ch1 and the sensor Ch3 will be the ineffective region.

Next, the configuration of the reading apparatus according to the second exemplary embodiment will be described referring to FIG. 10.

Figure 10:
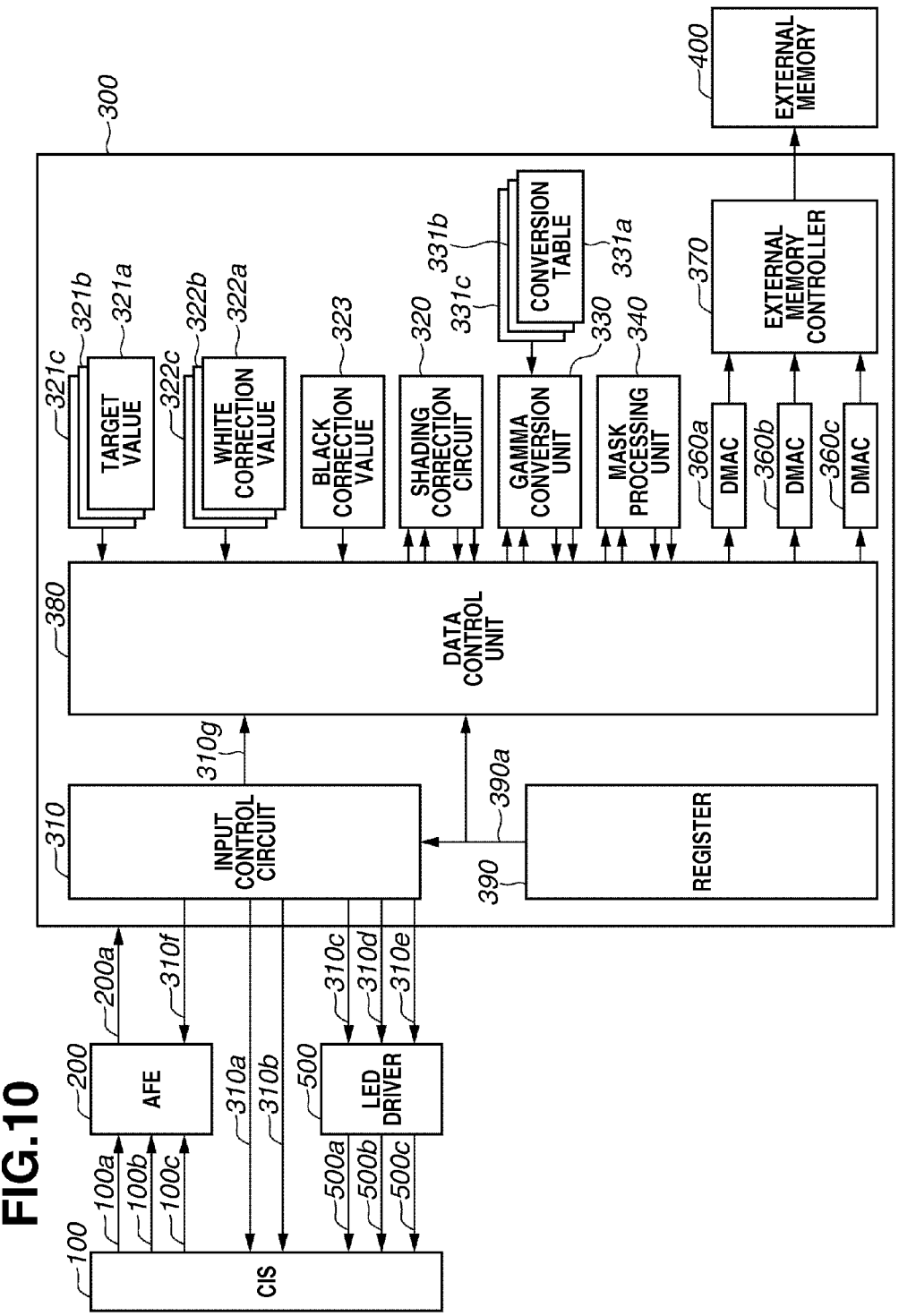
FIG. 10 is a block diagram illustrating a configuration of the reading apparatus.

FIG. 10 illustrates a modification of the configuration illustrated in FIG. 2 according to the first exemplary embodiment. Alphanumeric characters same as those shown in FIG. 2 are applied to the parts which are in common with the first exemplary embodiment and detailed descriptions will be omitted.

In FIG. 10, an LED driver 500 controls the lighting of LEDs of a plurality of colors (R, G, and B) used for lighting the document which the CIS 100 reads.

The LED driver 500 receives a light source control signal 310c output from the input control circuit 310 and sends a signal 500a used for turning on the R light source to the CIS 100.

The CIS 100 turns on the R light source in synchronization with a line synchronization signal 310a output at the timing of the line trigger signal SP (1) in FIG. 3 and accumulates a charge in a photoelectric conversion element in the CIS 100. Further, in synchronization with the line synchronization signal 310a output at the timing of the line trigger signal SP (2) in FIG. 3, the charge accumulated in the photoelectric conversion element is output to the AFE 200 as an analog output signal 100a of the R component.

Further, the LED driver 500 receives a light source control signal 310d output from the input control circuit 310 and sends a signal 500b used for turning on the G light source to the CIS 100. The CIS 100 turns on the G light source in synchronization with the line synchronization signal 310a output at the timing of the line trigger signal SP (2) in FIG. 3 and accumulates a charge in a photoelectric conversion element in the CIS 100. Further, in synchronization with the line synchronization signal 310a output at the timing of the line trigger signal SP (3) in FIG. 3, the charge accumulated in the photoelectric conversion element is output to the AFE 200 as an analog output signal 100b of the G component.

Furthermore, the LED driver 500 receives a light source control signal 310e output from the input control circuit 310 and sends a signal 500c used for turning on the B light source to the CIS 100. The CIS 100 turns on the B light source in synchronization with the line synchronization signal 310a output at the timing of the line trigger signal SP (3) in FIG. 3 and accumulates a charge in a photoelectric conversion element in the CIS 100. Further, in synchronization with the line synchronization signal 310a output at the timing of the line trigger signal SP (4) in FIG. 3, a charge accumulated in the photoelectric conversion element is output to the AFE 200 as an analog output signal 100c of the B component.

The analog output signals 100a, 100b, and 100c are output from the CIS 100 to the AFE 200 via each signal line provided for each of the analog output signals. The analog output signals 100a, 100b, and 100c are output in synchronization with a sensor clock signal 310b supplied from the input control circuit 310

According to the above-described processes, analog output signals of the three colors corresponding to the pixel data of the first line are output from the CIS 100 and input in the AFE 200.

Subsequently, analog output signals of the three colors corresponding to the pixel data of the second line are output from the CIS 100 and input in the AFE 200. More specifically, the LED driver 500 receives the light source control signal 310c output from the input control circuit 310 and outputs the signal 500a used for turning on the R light source. The signal 500a is input in the CIS 100.

The CIS 100 turns on the R light source in synchronization with the line synchronization signal 310a output at the timing of the line trigger signal SP (4) in FIG. 3 and accumulates a charge in a photoelectric conversion element in the CIS 100. Further, in synchronization with the line synchronization signal 310a output at the timing of the line trigger signal SP (5) in FIG. 3, a charge accumulated in the photoelectric conversion element is output to the AFE 200 as the analog output signal 100a of the R component. As described above, the analog output signal 100a is output in synchronization with the sensor clock signal 310b supplied from the input control circuit 310.

Analog output signals of the G and B components (analog output signals 100b and 100c) are also output from the CIS 100 and input in the AFE 200.

By repeating the above-described processing for the pixel data of each line, analog output signals corresponding to the pixels of a plurality of lines in one page of a document is output from the CIS 100 and input in the AFE 200.

Figure 11:
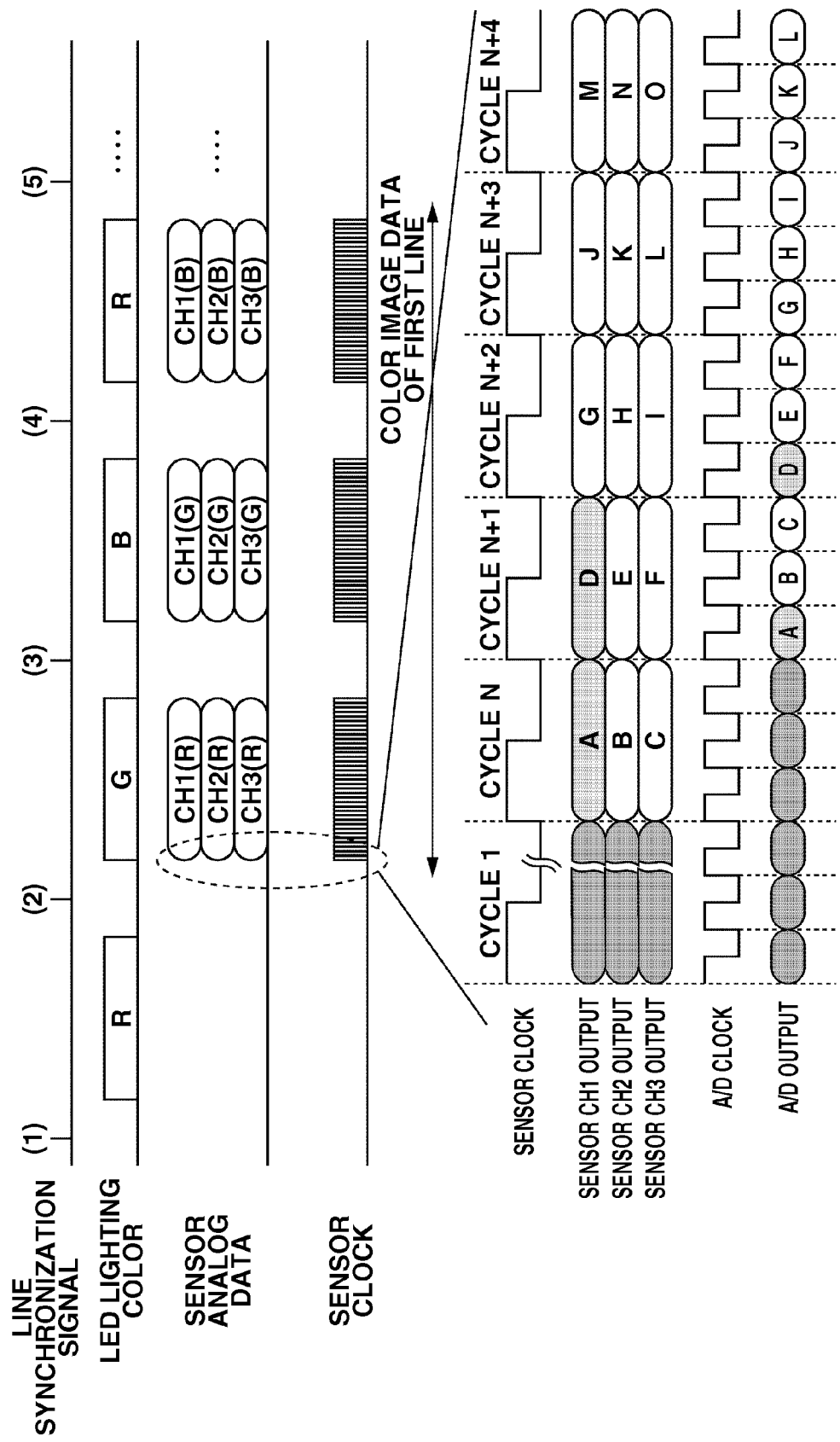
FIG. 11 illustrates digitization and serialization of analog data.

FIG. 11 illustrates digitization and serialization of the analog output signals 100a, 100b, and 100c output from the CIS 100. The digitization and serialization are performed by the AFE 200. When the processing is completed, image data 200a is output from the AFE 200.

In FIG. 11, each of the sensor output areas that are shaded represents an ineffective analog output signal. Further, an A/D clock signal 310f sent from the input control circuit 310 to the AFE 200 is illustrated as A/D clock and the image data 200a output from the AFE 200 is illustrated as A/D output.

The CIS 100 outputs the analog output signals 100a, 100b, and 100c from the respective sensor channels in synchronization with the sensor clock signal 310b. When the AFE 200 receives the analog output signals from the CIS 100, the AFE 200 digitally converts the analog output signals and outputs digitally-converted image data.

FIG. 11 illustrates an example where the latency of the AFE 200 is one cycle. As can be seen from FIG. 11, regarding a cycle of each sensor channel outputting an analog signal, digitally-converted image data is output in synchronization with a next cycle of the A/D clock signal 310f.

If the region from which the image data is read out is the effective image readable region illustrated in FIG. 8, data A in cycle N will be the first pixel, data B will be the 1873rd pixel, and data C will be the 3745th pixel in FIG. 11. Since the pixel position of the pixel to be output from each channel is shifted one pixel, data D of cycle N+1 will be the second pixel, data E will be the 1874th pixel, and data F will be the 3746th pixel.

The data A (the first pixel) is output from the sensor Ch1 in synchronization with the first A/D clock signal 310f of the cycle N+1 of the sensor clock signal 310b. Similarly, the data B (1873rd pixel) is output from the sensor Ch2 in synchronization with the second A/D clock signal 310f of the cycle N+1 of the sensor clock signal 310b according to which the data A has been output. Further, the data C (3745th pixel) is output from the sensor Ch3 in synchronization with the third A/D clock signal 310f of the sensor clock cycle according to which the data A and B has been output.

In FIG. 11, the areas representing the data A and D of the sensor Ch1 are horizontally shaded so as to indicate that the data is taken from the left end of the sensor Ch1 which is not the effective image readable region.

Next, a block diagram of the input control circuit will be described referring to FIG. 12.

FIG. 12 illustrates a modification of the configuration illustrated in FIG. 5 according to the first exemplary embodiment. Alphanumeric characters same as those shown in FIG. 5 are applied to the parts which are in common with the first exemplary embodiment and detailed descriptions will be omitted.

A sensor attribute identification unit 318 outputs an identification signal indicating a sensor channel which the image data that is input corresponds to. As illustrated in FIG. 10, the three analog output signals (100a, 100b, and 100c) that are input are output in synchronization with the A/D clock signal 310f. The image data output in synchronization with the first A/D clock signal 310f in the cycle of the sensor clock signal 310b is digital image data corresponding to the analog output signal 100a of the sensor Ch1.

Further, the image data output in synchronization with the second A/D clock signal 310f in the cycle of the sensor clock signal 310b is digital image data corresponding to the analog output signal 100b of the sensor Ch2. Similarly, the image data output in synchronization with the third A/D clock signal 310f in the cycle of the sensor clock signal 310b is digital image data corresponding to the analog output signal 100c of the sensor Ch3.

Thus, if the correlation between the sensor clock signal 310b and the A/D clock signal 310f is recognized, it is possible to determine the sensor channel which the input image data corresponds to. The sensor attribute identification unit 318 recognizes this correlation and outputs a sensor attribute identification signal 318a.

The sensor attribute identification signal 318a does not indicate the position of the effective image readable region which the input image data corresponds to or the pixel position (e.g., first pixel) having the left end of the sensor Ch1 as a reference position. The sensor attribute identification signal 318a only indicates the sensor channel from which the image data has been output.

An LED control signal generation circuit 319 generates the light source control signals 310c, 310d, and 310e and outputs them to the LED driver 500. A sensor device timing generation circuit 410 generates the line synchronization signal 310a and the sensor clock signal 310b, and outputs them to the CIS sensor 100. An A/D control signal generation circuit 316 outputs the A/D clock signal 310f to the AFE 200. As described above, the relation of the frequency ratio regarding the sensor clock signal 310b and the A/D clock signal 310f is 1:3.

An image output unit 315 outputs various signals output from the processing units in the preceding stage by merging them. In other words, the image output unit 315 merges image data 311a, a color information identification signal 312a, and the sensor attribute identification signal 318a, and further adds a signal that indicates whether the image data to be output is effective/ineffective. Then the image output unit 315 outputs the obtained signal as an output signal 310g.

An identification signal that indicates whether the output signal 310g output from the image output unit 315 is effective/ineffective is generated using a register 390a connected to the input control circuit 310. FIG. 13A illustrates the configuration of the register 390a. FIG. 13B illustrates sensor output timing of the CIS 100. FIG. 13C illustrates a configuration of an effective pixel instruction of each sensor channel.

FIG. 13A illustrates an example of the configuration of the register 390a including eight parameters. In FIG. 13A, the "reading operation start flag" is a register which is set by a control unit (not shown) before the reading is started. When this register is set when the reading is started, the input control circuit 310 determines that the line synchronization signal 310a sent to the CIS 100 is effective. In other words, the input control circuit 310 controls the switching of the color information identification signal 312a and the sensor attribute identification signal 318a, which are input in synchronization with the line synchronization signal 310a.

The "sensor offset" in FIG. 13A is for setting the number of the ineffective pixels from the sensor edge (the shaded areas in FIG. 13B). In counting the number of the ineffective pixels, the A/D clock signal 310f can be used as well as the sensor clock signal 310b. If the A/D clock signal 310f is used, then the frequency ratio between the sensor clock signal 310b is reflected in setting the value.

The "sensor Ch1 data offset" in FIG. 13A designates the number of pixels from the left end of the sensor Ch1. According to the present embodiment, since the ineffective pixel of the CIS 100 is included in the left end of the sensor Ch1, a value greater than 0 is set at the time of any reading. The "sensor Ch1 effective pixel number" in FIG. 13A designates the number of the effective pixels of the sensor Ch1. A sum of the "sensor Ch1 data offset" and the "sensor Ch1 effective pixel number" equals the number of pixels included in the sensor Ch1.

Similarly, the "sensor Ch2 data offset" designates the number of pixels from the left end of the sensor Ch2, and the "sensor Ch2 effective pixel number" designates the number of effective pixels of the sensor Ch2. Unlike the sensor Ch1, however, there is no ineffective pixel of the CIS 100 in the sensor Ch2. Thus, the effective setting value of the "sensor Ch2 data offset" is 0. A case where a value other than 0 is set for the sensor Ch2 data offset is when, for example, a small number of pixels of the sensor Ch2 is read or the reading of the image data is started not from the first pixel of the sensor Ch2 and the reading continues to the pixel in the sensor Ch3 according to a user's instruction.

The "sensor Ch3 data offset" is set by designating the number of pixels from the left end of the sensor Ch3 and the "sensor Ch3 effective pixel number" designates the number of the effective pixels of the sensor Ch3. As is with the sensor Ch2, there is no ineffective pixel of the CIS 100 in the left end of the sensor Ch3. Thus, 0 will be the effective setting value for the setting value of the "sensor Ch3 offset". A case where a value greater than 0 is set for the sensor Ch3 data offset is when, for example, a small number of pixels of the sensor Ch3 is read.

In this way, by setting each parameter of the register 390a, the sensor offset having the line synchronization signal 310a as the starting point and the effective/ineffective pixel of each sensor channel of the CIS 100 can be designated. Thus, the image output unit 315 can identify which pixel out of a plurality pieces of pixel data included in the input image data is effective or ineffective.

FIGS. 14A to 14C illustrate output information of the image output unit 315. FIG. 14A illustrates an example of an attribute of the color information identification signal 312a which the color information identification unit 312 sends to the image output unit 315. Since the color components are represented by R, G, and B, and a monochromatic component is represented by N, four types of color information identification are illustrated in FIG. 14A. A 2-bit signal, which is the color information identification signal 312a, is assigned to each of the components.

If the color information of the image data 200a which is sent from the AFE 200 is R, then the color information identification unit 312 outputs a 2-bit attribute signal "00" as the color information identification signal 312a. Similarly, if the color information of the image data 200a is G, then a 2-bit attribute signal "01" is output as the color information identification signal 312a. Further, if the color information of the image data 200a is B, then a 2-bit attribute signal "10" is output as the color information identification signal 312a.

The 2-bit attribute signal is changed according to a setting value of the reading operation start flag and the line synchronization signal 310a. In other words, after the reading operation start flag is set by a control unit (not shown), the 2-bit attribute signal is changed according to timing of the line synchronization signal 310a.

FIG. 14B illustrates an attribute example of the sensor attribute identification signal 318a which the sensor attribute identification unit 318 sends to the image output unit 315.

According to the present embodiment, since the CIS 100 includes three photoelectric conversion element groups (the sensor Ch1, the sensor Ch2, and the sensor Ch3), there are three types of sensor attribute identification signals.

More specifically, the sensor attribute identification unit 318 outputs a 2-bit attribute signal "00" as the sensor attribute identification signal 318a if the image data 200a input by the AFE 200 is data from the sensor Ch1. Similarly, if the data is from the sensor Ch2, "01" is output. Further, if the data is from the sensor Ch3, "10" is output.

The image output unit 315 adds an identification signal used for identifying whether a pixel of an input image data is effective or ineffective to the color information identification signal 312a, the sensor attribute identification signal 318a, and the image data 311a. The identification of whether the pixel of the input image data is effective or ineffective is performed according to a parameter set in the register 390a.

First, the offset common to each sensor channel is identified according to the sensor offset value set in the register 390a. Further, the offset of each sensor channel is identified according to the sensor offset value of each sensor set in the register 390a.

For example, if reading of the effective image readable region illustrated in FIG. 8 is performed, then ineffective data exists in the left end portion of the sensor Ch1. Since this ineffective data is set as the sensor Ch1 offset, if the image data 200a output from the AFE 200 corresponds to the sensor Ch1, an identification signal indicating that the data is ineffective is output for a predetermined number of pixels.

An example of this case is illustrated in FIG. 14C.

FIG. 14C illustrates a state of a signal of a pixel in the vicinity of the sensor offset position set in the register 390a when the R component is read. The output latency of the AFE 200 is one cycle. Since the reading component is the R component, the color information identification unit 312 outputs "00" as the color information identification signal 312a. Since the color information identification unit 312 changes the color information identification signal which is output according to the input timing of the line synchronization signal 310a input after the reading operation start flag is set in the register 390a, the identification signal is changed from "00" to "01", "10", "00" . . . each time the line synchronization signal 310a is input.

Since the cycles 1 and 4 are the output after the digital conversion of the sensor Ch1, the sensor attribute identification unit 318 outputs "00" as the sensor attribute identification signal 318a of these cycles. Similarly, since the cycles 2 and 5 are the output after the digital conversion of the sensor Ch2, "01" is output for these cycles. Further, since cycles 3 and 6 are the output after the digital conversion of the sensor Ch3, "10" is output for these cycles.

If the sensor Ch1 offset value set in the register 390 is two pixels, the analog output signal 100a for two pixels of the sensor Ch1 subsequent to the sensor offset position will be ineffective. Thus, the image output unit 315 sets an effectiveness identification signal corresponding to the cycles 1 and 4 to '0'. Since the analog output signal 100b of the sensor Ch2 and the analog output signal 100c of the sensor Ch3 are effective in the positions after the sensor offset position, the effectiveness identification signal of the cycles 2, 3, 5, and 6 will be '1'.

In this way, the image output unit 315 merges the attribute signal generated by the processing units in the preceding stage and the image data. Further, the setting values set in the register 390a are reflected and the effectiveness identification signal is added. In this way, data sorting performed by the processing units in the subsequent stage will be easier.

The shading correction circuit 320 performs correction processing of the output data 310g output from the input control circuit 310 in the preceding stage. The correction processing uses a correction coefficient (white correction value: Dwhite, black correction value: Ddark) corresponding to the sensor pixel position of the corresponding color component. The white correction value is obtained by reading a white board (reference data) before the image data of the document is read. In other words, according to the reading by the CIS 100 using the three light sources, a light source corresponding to each color component is turned on and a reading value of the white board for each color is acquired.

The white correction value is the reading value of the white board that is acquired. Thus, a control unit of the reading apparatus (not shown) assigns the obtained white correction value to the color component and stores the value in the white correction values 322a, 322b, and 322c being the storage units.

The position of the pixels of the white correction value and the number of such pixels are set so that they are in a correlation with the position of the subsequent pixels and the number of such pixels of the document image data. For example, if the acquired white correction value is in the effective image readable region illustrated in FIG. 8 and the reading start position of the document image data is the 20th pixel position from the first pixel of the effective image readable region of the sensor Ch1, then the first 19 pixels of the acquired white correction value is not necessary in the correction performed at the time of document image reading. Thus, the correction value excluding the first 19 pixels of the acquired white correction value will be set as the white correction value in the 322a, 322b, and 322c. In other words, according to the reading region of the document image data, address 0 of the white correction values 322a, 322b, and 322c is set so that it is the correction value of the first pixel of each color component.

The black correction value corresponds to a reading level when the light source is turned off. Thus, a control unit (not shown) of the reading apparatus sets the value which is obtained when the light source is turned off in the black correction value 323 being the storage unit.

Not all of the acquired correction values that are read out are set as the black correction value as is with the setting of the white correction value. The correction value is set so that the address 0 of the black correction value 323 is the correction value of the first pixel of the reading region of the document image data.

The target value (Dtarget) of the shading correction processing is used for setting a highest brightness level (white level) of a reading color component according to reading bit accuracy. Thus, the Dtarget does not depend on the pixel position of each sensor channel of the CIS 100. Thus, one value is set for the R, G, and B components.

If the image data 310g is input in the order illustrated in FIG. 14C at the time of the reading operation, a data control unit 380 recognizes the color component and the sensor channel attribute of the image data from the image data 310g. According to each attribute signal added to the image data 310g, the data control unit 380 determines that the first pixel having '1' as its effectiveness identification signal is the image data of the R color component and of the sensor Ch2. Thus, the data control unit 380 selects the R component target value 321a and the white correction value 322a. As for the black correction value, since it is a correction data value when the light source is turned off and independent of the color component, the data control unit 380 selects the black correction value 323.

The white correction value and the black correction value used for the shading correction processing are stored in the pixel order by which the reading is performed. If the image data output from the input control circuit 310 is continuously input from the first pixel in the main scanning direction, then the white correction value and the black correction value can be obtained by reading out the pixel data from the starting address of each memory. However, since the data obtained by the reading by the CIS 100 is discontinuous, the image data is not input continuously from the first pixel. Thus, the data control unit 380 configures a counter for each sensor channel. The counter is used for acquiring the white correction value and the black correction value used for the shading correction processing.

Figure 15:
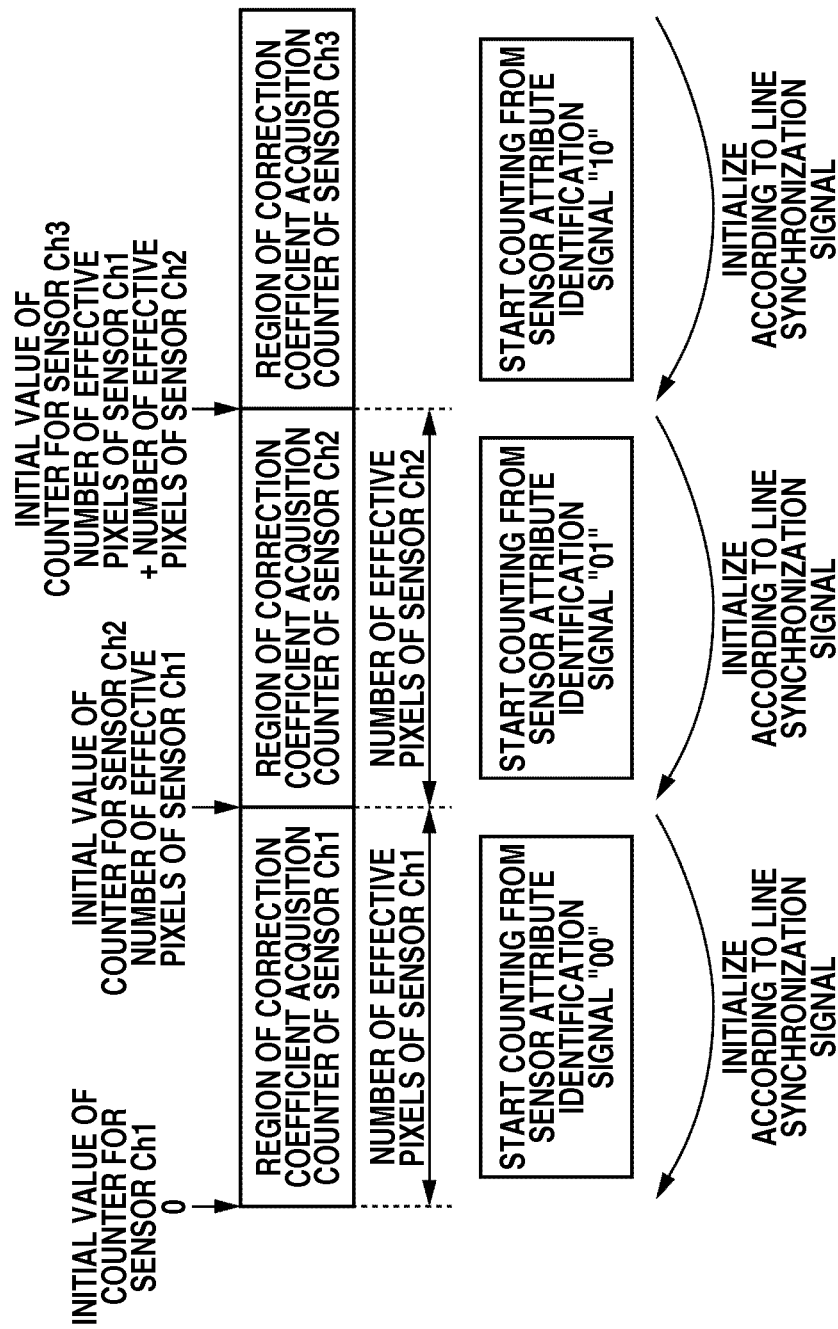
FIG. 15 is a conceptual drawing of a counter configuration.

FIG. 15 illustrates a conceptual diagram of a counter configuration. Three counters are illustrated in FIG. 15. One counter is for acquiring a correction coefficient of the sensor Ch1 and its initial value is 0. There is also a counter for acquiring a correction coefficient of the sensor Ch2 and its initial value is the number of effective pixels of the sensor Ch1 stored in the register 390a. Furthermore, another counter for acquiring a correction coefficient of the sensor Ch3 is provided and its initial value is a sum of the number of effective pixels of the sensor Ch1 and the sensor Ch2 stored in the register 390a.

These counters increment only when the sensor attribute identification signal of the image data 310g indicates a sensor attribute of a subject attribute. Further, the counters are initialized when the line synchronization signal 310a is input.

Since each counter increments only when the attribute is a subject attribute, regarding a sensor channel, such as the sensor Ch1, whose effectiveness is not identified when the reading is started, the counter value for acquiring the correction value remains unchanged. Thus, when an effectiveness-identified image data is input, a memory address of a correction value to be acquired is indicated. Further, since the initial value of the sensor Ch2 or Ch3 offsets the number of effective pixels before the position of the corresponding sensor, even if the reading position is changed according to the user's instruction, the correlation between the input image data and each correction value is maintained.

The data control unit 380 selects a counter output that matches the sensor attribute identification signal 318a of the input image data as a white correction value acquisition address and a black correction value acquisition address. In other words, according to the example described above, since the first pixel that is input is the image data of the sensor Ch2, the counter output value for acquiring a correction coefficient of the sensor channel Ch2 will be selected.

When the address of the white correction value acquisition and the address of the black correction value acquisition are selected, the white correction value and the black correction value are acquired. Accordingly, all the coefficients necessary in performing the shading correction processing are obtained. Further, the counter for acquiring the correction coefficient of the sensor Ch2 starts the count up processing (address adding) when the corresponding image data is input.

The data control unit 380 merges the acquired white correction value (Dwhite), the black correction value (Ddark), and the target value (Dtarget) with the image data, and sends the merged data to the shading correction circuit 320. The shading correction circuit 320 performs the correction processing by applying equation (1) according to the first exemplary embodiment to each correction value and image data that is input.

Generally, the bit accuracy of the image data after the shading correction processing is reduced compared to the bit accuracy of the image data output from the input control circuit 310. This is because the bit accuracy is reduced due to the multiplication and division of the shading correction calculation according to equation (1).

The data that has undergone the correction performed by the shading correction circuit 320 is output to the data control unit 380 together with the color information identification signal 312a having implemented the adjustment corresponding to the latency required in the correction processing and the sensor attribute identification signal 318a. According to the above-described processing, the shading correction processing of the image data that is input discontinuously in the main scanning direction is performed.

The data control unit 380 sends the image data that has undergone the shading correction processing to the gamma conversion unit 330 being the next image processing unit. The gamma conversion is a process for changing the level of the image data that is input using the conversion tables 331a, 331b, and 331c set for each color component by a control unit (not shown). The data control unit 380 sends the image data that has undergone the shading correction processing, the color information identification signal 312a, and the sensor attribute identification signal 318a to the gamma conversion unit 330.

The gamma conversion unit 330 analyzes the color information identification signal 312a added to the image data that has undergone the shading processing and recognizes a color component to be processed. Then, the gamma conversion unit 330 selects a conversion table corresponding to the color component of the image data that is input and processes the image data.

For example, if the color component of the image data is R, the gamma conversion unit 330 selects the conversion table 331a and performs the conversion processing. The gamma conversion unit 330 outputs the image data after the conversion processing together with the color information identification signal 312a having the latency necessary in the conversion adjusted and the sensor attribute identification signal 318a. The accuracy of the image data input in the gamma conversion unit 330 equals the image data accuracy after the shading correction (approximately 10 bit), and the accuracy of the image data output from the gamma conversion unit 330 equals the image data accuracy of the image data output from the reading apparatus (8 bits).

The data control unit 380 outputs the image data that has undergone the gamma conversion to the mask processing unit 340 being an image processing unit of the subsequent stage. The mask processing is used for replacing a predetermined number of pixels in the peripheral portion of the image data of the document that is read with pixels having a designated pixel level (white level).

Figure 16:
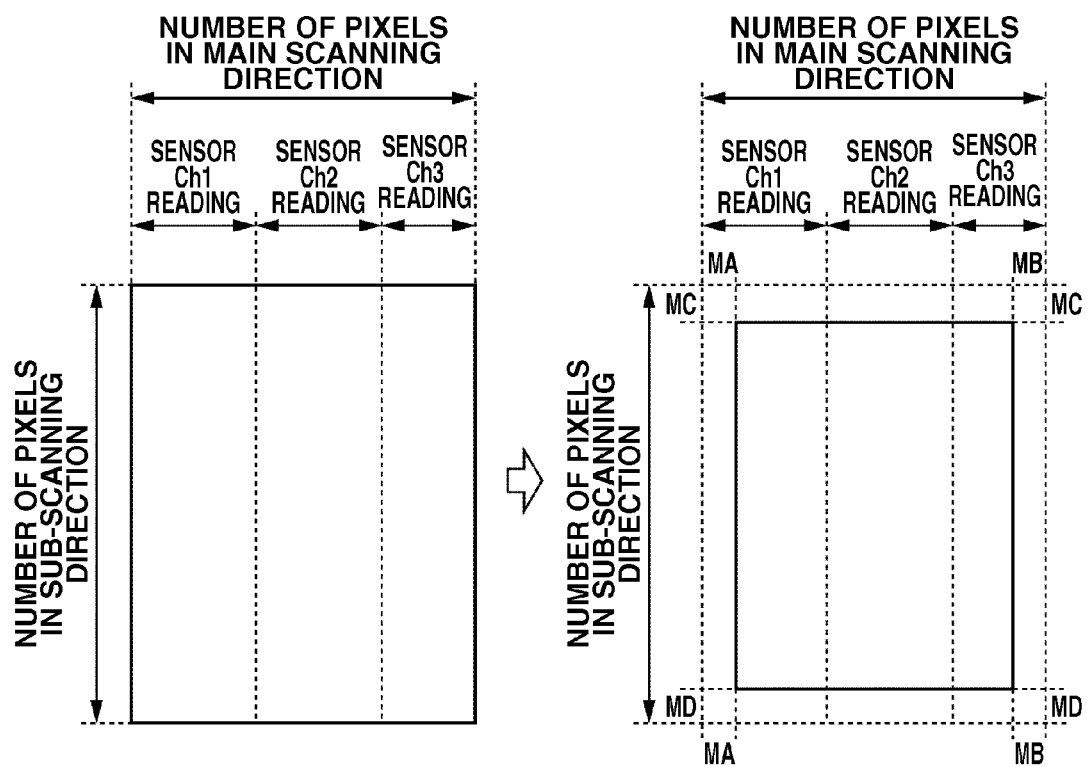
FIG. 16 illustrates an example of mask processing setting.

FIG. 16 illustrates an example of the pixel setting for the mask processing. In FIG. 16, the shaded areas indicate the document image data that is read. The non-shaded areas illustrate the areas to which the mask processing is to be performed. In performing the mask processing, parameters of a left end (MA), a right end (MB), a top end (MC), and a bottom end (MD) are set for the document image data that is read and pixel data of such regions is replaced.

If the document image data that is read, in other words, the image data output from the gamma conversion processing unit 330, is continuous in the main scanning direction, the configuration of a mask processing unit can be simplified. This is because the pixel data of a predetermined range can be replaced by a counter that determines a pixel position in the main scanning direction and another counter that determines the pixel position in the sub-scanning direction. However, since the analog output of the CIS 100 is discontinuous in the main scanning direction, if the reading apparatus does not include a memory for rearrangement, the discontinuous input needs to be controlled.

The mask processing unit 340 processes the input image data which is discontinuous in the main scanning direction using a counter similar to that of the shading correction processing unit 320 that controls the correction values. In other words, a counter is provided for each attribute that the sensor attribute identification signal 318a indicates. As described above, the sensor attribute identification signal 318a is added to the input image data.

A mask control counter for the sensor Ch1 has 0 as its initial value. A mask control counter for the sensor Ch2 has the number of effective pixels of the sensor Ch1 stored in the register 390a as its initial value. Furthermore, a mask control counter for the sensor Ch3 has a sum of the number of effective pixels of the sensor Ch1 and the sensor Ch2 stored in the register 390a as its initial value. These counters operate only when the attribute indicated by the sensor attribute identification signal 318a added to the input image data is an attribute of the sensor to be processed. Further, the counters are initialized when the line synchronization signal 310a is input.

Since the mask processing unit 340 performs the processing of all the document image data that is read out, it is necessary to detect not only the pixel positions in the main scanning direction but the pixel positions in the sub-scanning direction. Thus, a counter for detecting a pixel position in the sub-scanning direction is also configured. In detecting a pixel position in the sub-scanning direction, it is necessary to detect whether a predetermined number of pixels are input in the main scanning direction. Thus, a pixel counter in the main scanning direction, which does not depend on the sensor channels, is provided in addition to the counters used for detecting the pixel positions in the main scanning direction that correspond to each of the sensor channels.

The pixel counter in the main scanning direction that does not depend on the sensor channels starts counting when the effectiveness identification signal added to the input image data is '1'. Thus, the reading of the document image data in the main scanning direction of this counter is completed when the counter value reaches a sum of the number of effective pixels of the sensor Ch1, the number of effective pixels of the sensor Ch2, and the number of effective pixels of the sensor Ch3 stored in the register 390a.

In other words, the pixel position in the sub-scanning direction is counted at this timing. The pixel counter in the main scanning direction that does not depend on the sensor channels is initialized (initial value 0) when the line synchronization signal 310a is input as is with the pixel counters in the main scanning direction corresponding to each sensor channel.

Now, the mask processing in the main scanning direction performed by the mask processing unit 340 will be described. The mask processing unit 340 selects a counter corresponding to a sensor channel indicated by the sensor attribute identification signal 318a. For example, if the sensor attribute identification signal 318a indicates the sensor Ch1, the mask processing unit 340 selects the mask control counter for the sensor Ch1.

If the selected counter value corresponds to the mask region in the main scanning direction, the mask processing unit 340 replaces the image data output from the gamma conversion processing unit 330 with image data of a predetermined pixel level. At this time, if the pixel level replaced for each color component is to be changed, the mask processing unit 340 replaces the image data while referring to the color information indicated by the color information identification signal 312a.

The mask processing counter selected by the mask processing unit 340 is changed according to the value indicated by the sensor attribute identification signal 318a. Thus, the obtained counter values may be discrete depending on the image data region of the document. However, since the obtained counter values indicate the positions of the input image data in the main scanning direction, the values can be directly compared with a region designation parameter for the mask processing.

For example, when the number of the mask pixels of the left end (MA) is 10, if the selected counter value is 10 or less, the region is determined as the mask region, in other words, the region where the image data is to be replaced. Further, when the number of mask pixels of the right end (MB) is 20, if the selected counter value is greater than a value obtained by subtracting 20 from the number of pixels in the main scanning direction, the region is determined as the mask region.

Next, the mask processing in the sub-scanning direction performed by the mask processing unit 340 will be described. The mask processing unit 340 refers to a counter value indicating the pixel position in the sub-scanning direction and directly compares it with a region designation parameter for the mask processing in the sub-scanning direction. For example, when the number of mask pixels of the top edge (MC) is 30, if the selected counter value indicating the position in the sub-scanning direction is 30 or less, the region is determined as the mask region, in other words, the region where the image data is to be replaced.

Further, when the number of mask pixels of the bottom edge (MD) is 40, if the selected counter value equals a value obtained by subtracting 40 from the number of pixels in the sub-scanning direction or greater, the region is determined as the mask region. The mask processing performed by the mask processing unit 340, in other words, the replacement detection of image data is performed according to logical OR of the mask region detection in the main scanning direction and the mask region detection in the sub-scanning direction.

The processing of the mask processing unit 340 is performed based on an assumption that a different replacement level is set for each color component. However, if the image data is replaced according to a fixed level regardless of the color component, the color information identification signal is not necessarily included in the output of the gamma conversion unit 330.

Further, a similar effect can be obtained if the data control unit 380 does not send the color information identification signal 312a output from the gamma conversion unit 330 to the mask processing unit 340.

Figure 17:
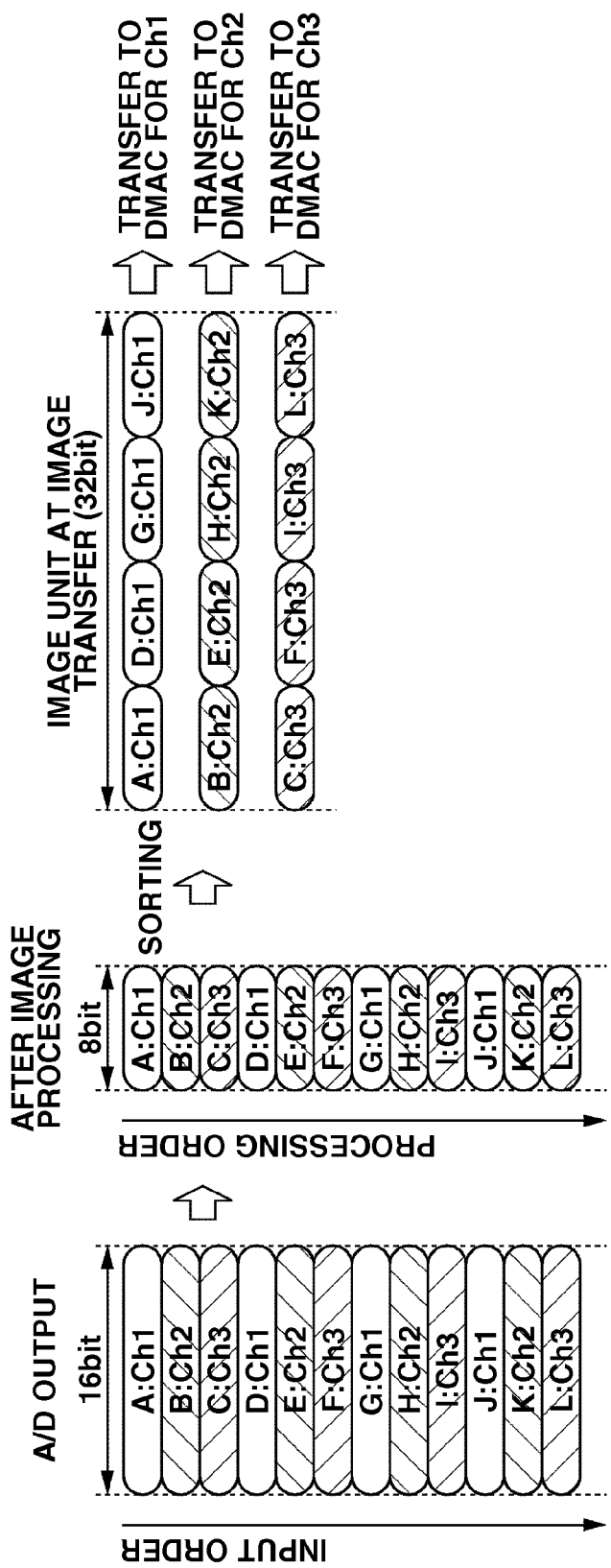
FIG. 17 illustrates a data format of data input in a data control unit and input order.

When the data control unit 380 receives the image data output from the mask processing unit 340 and the sensor attribute identification signal 318a whose latency is adjusted, it sorts the image data to be transferred. According to the present embodiment, direct memory access controllers (DMAC 360a, DMAC 360b, and DMAC 360c) are used to make the image data, which is discontinuous in the main scanning direction, continuous in the main scanning direction. FIG. 17 illustrates an output data format and an input order of the data of the AFE 200, and also an input data format and an input order of the data of the data control unit 380.

In FIG. 17, the output format of the AFE 200 is in 16-bit accuracy. Further, the order of the image data is discontinuous in the main scanning direction when the data is input in the reading control unit 300. In FIG. 17, the value of the sensor attribute identification signal 318a of the image that is read out is repeated in the order of "00", "01", "10". Thus, image data A, D, G, and J is the image data read by the sensor Ch1, image data B, E, H, and K is the image data read by the sensor Ch2, and image data C, F, I, and L is the image data read by the sensor Ch3.

The order of processing of the image data performed by reading control unit 300 is the same as the order of output of the AFE 200, in other words, the order of input in the reading control unit 300. Accordingly, the image data is processed while it is discontinuous in the main scanning direction. However, unlike the bit accuracy of the AFE 200, the bit accuracy of the image data in FIG. 17 is 8-bit accuracy.

The data control unit 380 sets the pieces of image data discontinuous in the main scanning direction together for each sensor channel according to a value which the sensor attribute identification signal 318a added to the image data indicates. More specifically, the data control unit 380 packs the image data of a predetermined number of pixels according to a transfer unit of the DMA transfer in the subsequent stage.

For example, if the DMA transfer is performed in 32-bit blocks, the input image data (8 bit) for 4 pixels will be packed. Thus, in FIG. 17, the image data read by the sensor Ch1 for 4 pixels are packed. The packing of the pixels can be started in any order so long as it is consistent. Thus, it can be packed from the most significant bit (MSB) side or from the least significant bit (LSB) side.

According to the present exemplary embodiment, the image data A, D, G, and J is packed as image data of one transfer unit. Similarly, the image data B, E, H, and K is packed as image data of one transfer unit of the image data read by the sensor Ch2. Further, the image data C, F, I, and L is packed as image data of one transfer unit of the image data read by the sensor Ch3.

The data control unit 380 sends the image data packed in the DMA transfer unit to the DMAC corresponding to each sensor channel. In other words, the image data ready by the sensor Ch1 is sent to the DMAC 360a, the image data read by the sensor Ch2 is sent to the DMAC 360b, and the image data read by the sensor Ch3 is sent to the DMAC 360c.

Each of the DMAC 360a, the DMAC 360b, and the DMAC 360c outputs a transfer start address (hereinafter referred to as SA) designated by a control unit (not shown), and a request by which the image data is transferred according to the transfer amount, to the external memory controller 370. According to this request, the external memory controller 370 controls the external memory 400 to store the image data in the unit of transfer. When the image data is transferred, the SA of each DMAC is set according to the reading region of the document image data and the sensor configuration of the CIS 100.

Figure 18:
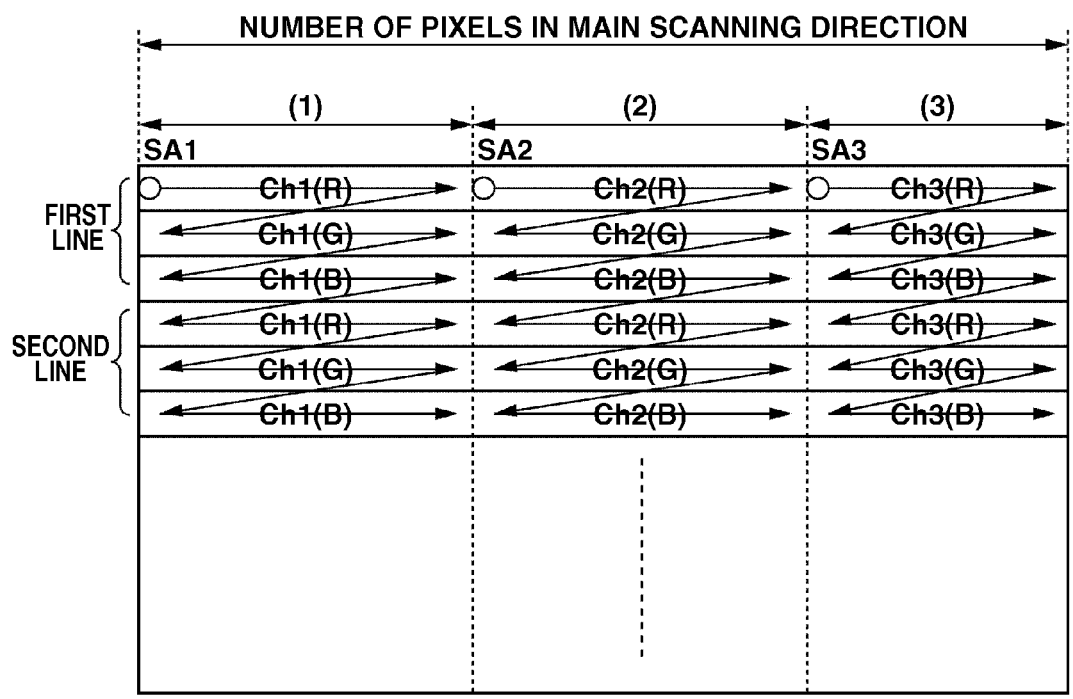
FIG. 18 illustrates start address (SA) setting of each DMAC and a transfer format.

FIG. 18 illustrates the SA setting of each DMAC and the transfer format. FIG. 18 conceptually illustrates a configuration of the external memory 400. The arrows indicate the transfer direction (writing operation) of the DMAC. An external memory region (1) is the transfer range of the DMAC 360a. Similarly, an external memory region (2) is the transfer range of the DMAC 360b. Further, an external memory region (3) is the transfer range of the DMAC 360c.

Each of the DMAC start addresses (SA1, SA2, and SA3) is discrete in the main scanning direction. However, at least the address that is in accordance with the amount of transfer of the DMAC 360a in the main scanning direction and the address of the SA2 of the DMAC 360b, and further the address that is in accordance with the amount of transfer of the DMAC 360b in the main scanning direction and the address of the SA3 of the DMAC 360c are continuous addresses. In other words, each of the DMAC start addresses (SA1, SA2, and SA3) is set according to an amount of image data read by each sensor channel.

The image data of the sensor Ch1 and of the R component is transferred having the transfer start address of the SA1. Similarly, the image data of the sensor Ch2 is transferred having the transfer start address of the SA2. Further, the image data of the sensor Ch3 is transferred having the transfer start address of the SA3. If the effective image readable region is as illustrated in FIG. 8, the image data of the sensor Ch1 is not input in the data control unit 380 when the reading is started.

Thus, the transfer is started from the image data of the sensor Ch2 and then the image data of the sensor Ch3 is transferred. However, when the transfer reaches the effective reading region of the sensor Ch1, the transfer of the image data of the sensor Ch1 is started. Since the SA2 of the DMAC for the sensor Ch2 is set according to the transfer amount of the sensor Ch1, the data is not duplicated in the external memory. Thus, the image data of the R component continuous in the main scanning direction is obtained from the external memory 400.

When the transfer of the image data of the R component is completed, the next transfer start address is used by each DMAC taking a predetermined offset into consideration. Then, data transfer of a transfer amount same as that for the R component is started. The transfer amount is set by a control unit (not shown). In this way, by setting the input image data according to the document reading region and the amount of image data transferred from each sensor channel, image data continuous in the main scanning direction can be obtained from the image data that is discontinuous in the main scanning direction.

As described above, according to the present exemplary embodiment, the input control circuit 310 adds a color information identification signal and a sensor attribute identification signal to each piece of pixel data included in the image data output from the AFE 200. Since each processing unit in the subsequent stage refers to the identification signal necessary in processing, simplified data control can be realized.

Further, regarding the input image data which depends on the reading region and is discontinuous in the main scanning direction, processing that flexibly corresponds to such image data can be performed. Even if the image processing depends on the pixel position, since the sensor attribute identification signal, which is added to the input image data, is referred to, a correction value which is correlated with the input image data discontinuous in the main scanning direction can be acquired.

Further according to the present embodiment, a memory used for rearranging the image data, which is discontinuous in the main scanning direction, before the image processing is not necessary. Thus, image data continuous in the main scanning direction can be obtained without using a large-capacity storage medium and the cost of the reading control apparatus is not increased.

Next, a third exemplary embodiment of the present invention will be described. Alphanumeric characters same as those in the configurations of the first and the second exemplary embodiments are applied to the parts which are in common with the first and the second exemplary embodiments and detailed descriptions will be omitted.

According to the first and the second exemplary embodiments, various identification signals are added to the image data that is read out. After image processing, the image-processed image data is transferred using a DMAC channel that corresponds to the identification signal. Further, according to the first and the second exemplary embodiments, image data is transferred and stored in an external memory in a continuous order in the main scanning direction.

However, the first and the second exemplary embodiments are based on a condition where the number of pixels that are read out by each sensor channel is in accordance with the DMAC transfer unit. According to the second exemplary embodiment, the bit accuracy of the image data generated by the image processing is 8 bits per pixel for one color component whereas the DMAC transfer unit is 32 bits. In other words, if the number of pixels that is read out is not in units of 4 pixels, the pixels are not packed for the DMAC transfer unit. Thus, the number of pixels read by each sensor channel needs to be in a multiple of 4.

According to the sensor configuration of the CIS 100, the number of effective pixels of each sensor channel can be set to a predetermined number of pixels (e.g., a multiple of 4). However, as described above, the number of pixels read out by each sensor channel is based on the user's instruction. Thus, the number of pixels read by each sensor channel does not always match the DMAC transfer unit of the reading control unit.

According to the third exemplary embodiment, a case where the reading number of pixels of the sensor Ch1 is not a multiple of 4 (1 pixel short) will be described. The image data read by the sensor Ch1 is sequentially output from the data of the first effective pixel and image processing of the data will be performed. After the image processing, the data is packed in units of 4 pixels being the DMAC transfer unit, and then stored in the external memory 400. However, regarding the final transfer data position of each component of the image data transferred by the DMAC 360a which transfers the image data read by the sensor Ch1, the image data necessary in the packing is not input.

Figure 19:
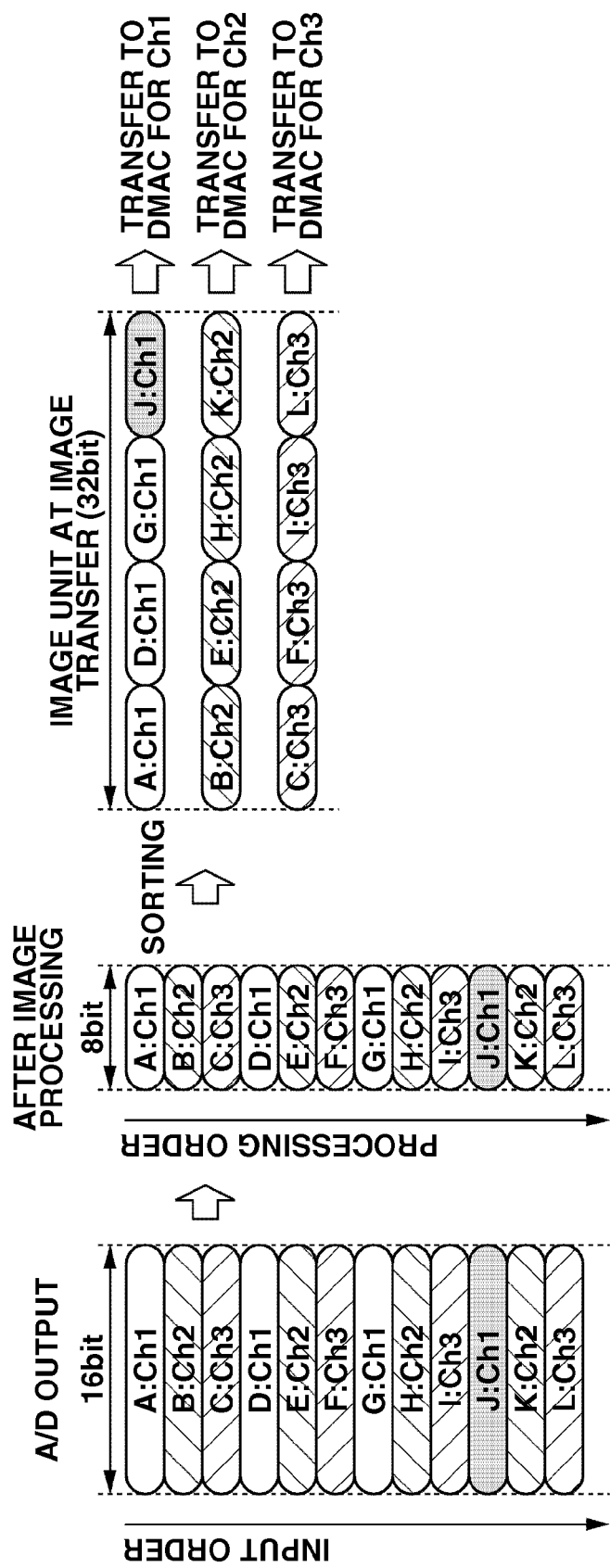
FIG. 19 illustrates packing of image data.

FIG. 19 illustrates a final transfer data configuration of each component of the DMAC 360a. In FIG. 19, the image data A, D, G, and J corresponds to the output of the sensor Ch1. Image data other than the image data A, D, G, and J corresponds to the output of the sensor Ch2 or sensor Ch3. Since the number of pixels is one less than a multiple of 4, although the image data A, D, and G is effective as image data, the image data J is not effective.

Figure 20:
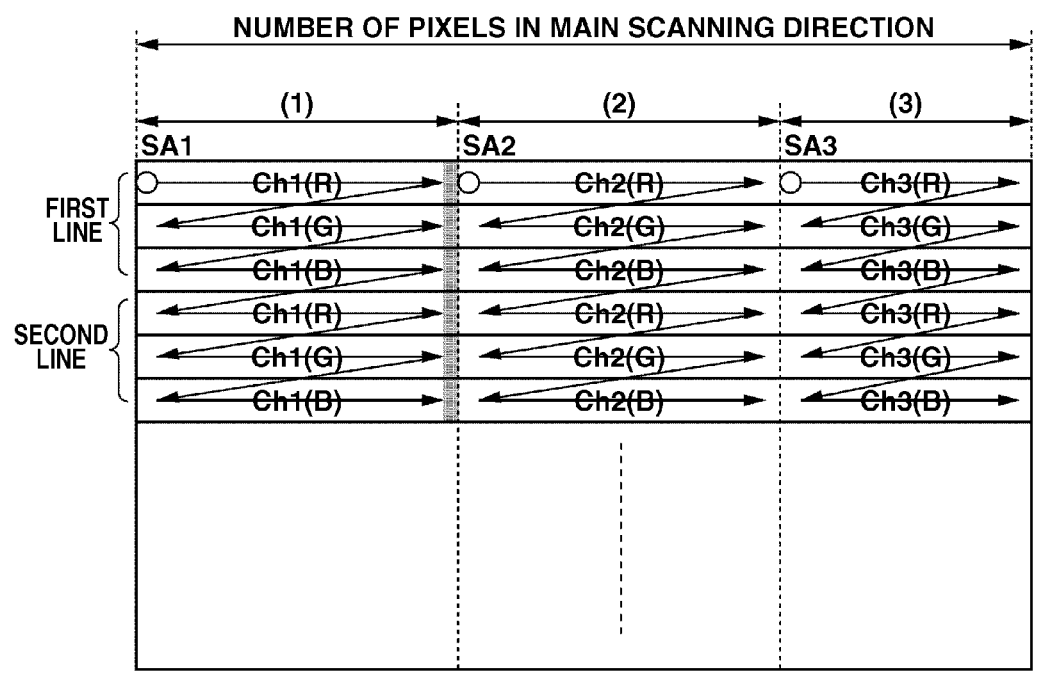
FIG. 20 illustrates a storage state of image data.

Thus, in this state, the packed data which is to be transferred to the DMAC 360a is not generated in units of one line and the transfer by the DMAC 360a is not performed as intended. In order to make the data in units of one line, it is possible to output the image data J, being the ineffective data directly after the effective data, so that the pixels can be packed. Then, the transfer by the DMAC 360a in units of one line can be performed. However, as can be seen from the shaded area in FIG. 20, the continuity with the data transferred by the DMAC 360b of the sensor Ch2 is not obtained in the external memory 400 to which the transfer data is transferred and the effect of the second exemplary embodiment cannot be obtained.

The starting pixel data of the reading line (starting pixel data of the sensor Ch1) have been described according to the description above. However, a similar problem remains with the pixel data of the end of the reading line (pixel data of the end of the sensor Ch3). Further, the problem is not limited to such sensor channels and a similar problem occurs with the sensor channel to which the starting pixel or the last pixel of the data whose reading instruction is given by the user corresponds.

According to the third exemplary embodiment, nine parameters are added to the register 390a. FIG. 21A illustrates a configuration of the register 390a according to the third exemplary embodiment. The parameters in the shaded areas are the parameters described in the second exemplary embodiment.

According to the third exemplary embodiment, insertion of a dummy pixel, an insertion position of the dummy pixel, and the number of dummy pixels can be designated for each sensor channel. In other words, with respect to the image data read by the sensor Ch1, the insertion of a dummy pixel (sensor Ch1 dummy pixel insertion), the insertion position of the dummy pixel (sensor Ch1 dummy pixel position: top/end), the number of dummy pixels (sensor Ch1 number of dummy pixels) can be designated.

This designation is applied to other sensor channels, in other words, the sensor Ch2 and the sensor Ch3. The control regarding the dummy pixel insertion is performed by the input control circuit 310 in the first stage of the reading control unit.

In a case where the reading region is as illustrated in FIG. 21B, the sensor channels that require the setting are the sensor Ch1 and the sensor Ch3. Since the reading of the sensor Ch1 is one pixel short with respect to the DMAC transfer unit, the setting of the dummy pixel of the sensor Ch1 will be as follows:
sensor Ch1 dummy pixel insertion: insert
sensor Ch1 dummy pixel position: top
sensor Ch1 dummy number of pixels: 1

Since the reading of the sensor Ch3 is two pixels short with respect to the DMAC transfer unit, the setting of the dummy pixel of the sensor Ch3 will be as follows:
sensor Ch3 dummy pixel insertion: insert
sensor Ch3 dummy pixel position: end
sensor Ch3 dummy number of pixels: 2

The dummy pixel added by the input control circuit 310 is input in the data control unit 380 in the subsequent stage and controlled according to the value indicated by each identification signal. Thus, the dummy pixel is also input in the shading correction circuit 320, the gamma conversion unit 330, and the mask processing unit 340. Since the processing of the gamma conversion unit 330 is performed according to the pixel units (table conversion processing) alone, a value that does not affect the output image data is set as the dummy pixel. Further, a mask processing region is set by the mask processing unit 340 according to the number of pixels including the dummy pixel.

However, since the shading correction processing is performed according to a correction value based on the pixel position as well as to the pixel units, a correction value having a correlation is necessary. Since a shading correction value (white correction value, black correction value) of a dummy pixel does not exist, if a counter is operated so as to acquire a correction value of a dummy pixel when a dummy pixel is input, a correction value which is shifted for a number of dummy pixels that are inserted is acquired. Thus, the data control unit 380 makes control referring to a parameter regarding various dummy pixels stored in the register 390a.

The data control unit 380 confirms a parameter regarding the dummy pixel of the sensor channel indicated by the sensor attribute identification signal 318a. If insertion of a dummy pixel is set for the sensor channel indicated by the sensor attribute identification signal 318a added to the input image data, the data control unit 380 performs control so that the counter used for controlling the acquisition of the correction value necessary in performing the shading correction processing is not operated for the number of dummy pixels that are inserted.

Further, when the data control unit 380 outputs the dummy pixel data to the shading correction circuit 320, it also selects and outputs a fixed parameter which does not affect the data after the shading correction processing. More specifically, if the white level (high luminance level) does not affect the output image data, a maximum value in the setting range is selected as the target value (Dtarget) of the dummy pixel and the black correction value is set to 0. Further, the white correction value is output as a value of a white level regarding the reading bit accuracy.

Figure 22:
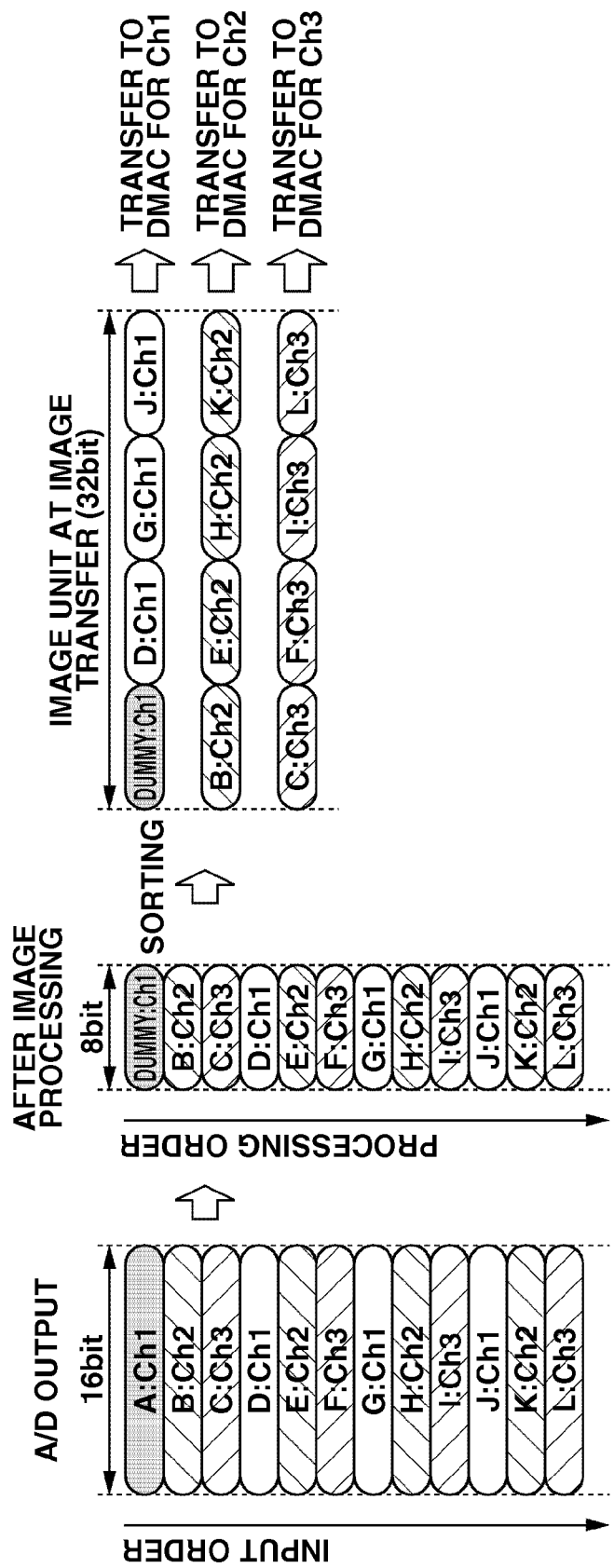
FIG. 22 illustrates packing of image data.

Then, according to the above-described control, even if the number of pixels that are read is not in accordance with the DMAC transfer unit, the output data after the image processing is processed appropriately in a state where the continuity in the main scanning direction is maintained by the DMAC transfer in units of one line. FIG. 22 illustrates a data configuration when one dummy pixel is added to the first pixel position of the sensor Ch1. In FIG. 22, the image data D, G, and J of the sensor Ch1 is the effective pixel data of the first three pixels. The image data A is shaded as it is not in the effective pixel position.

Regarding the data configuration of the sensor Ch1 illustrated in FIG. 22, the input control circuit 310 inserts a dummy pixel at the timing of the image data A being the ineffective pixel data of the sensor Ch1. Thus, a dummy pixel is set at the first pixel position even after the image processing is performed. Accordingly, the pixel shortage with respect to the DMAC transfer unit is filled and the packing is performed. The image data packed in this way is stored in the external memory 400 according to the DMAC transfer as illustrated in FIG. 23.

Figure 23:
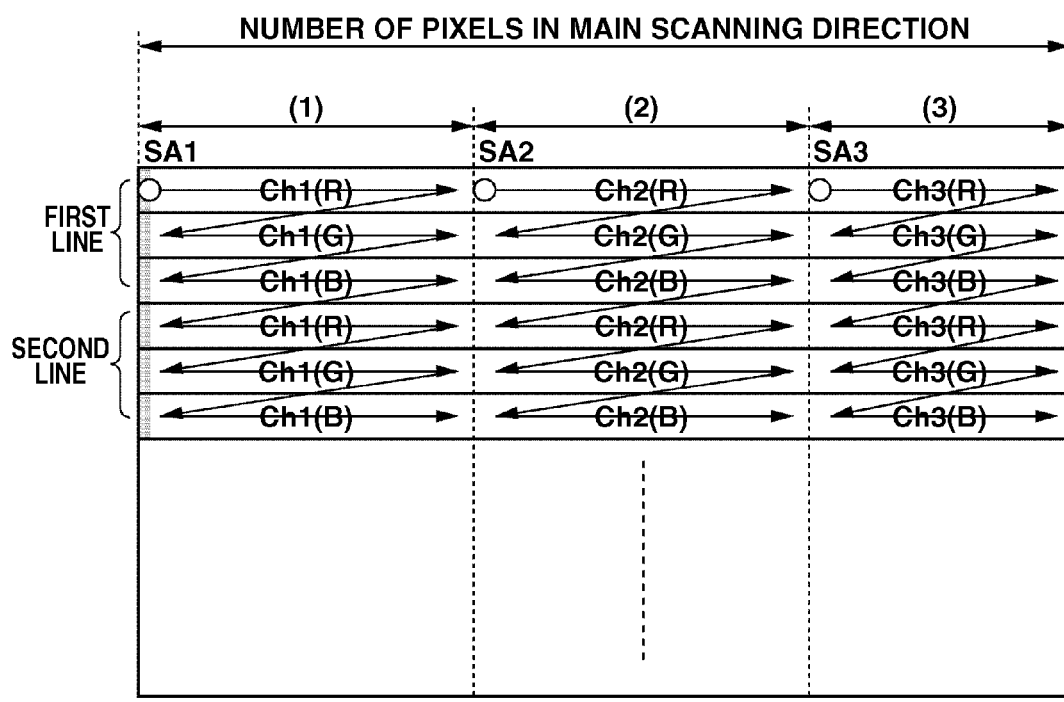
FIG. 23 illustrates a storage state of image data.

In FIG. 23, the shaded area indicates the dummy pixel inserted by the input control circuit 310. According to the insertion of the dummy pixel, the transfer in units of one line by the DMAC 360a is performed normally. Further, since a dummy pixel is inserted in the first pixel position, the continuity of the image data with respect to the first transfer pixel of the DMAC 360b for the sensor Ch2 in the main scanning direction can be maintained.

As described above, according to the present embodiment, even if the number of pixels that are read is not in accordance with the DMAC transfer unit with respect to each sensor channel in the CIS 100, an effect similar to that of the second exemplary embodiment can be obtained. In other words, without using a memory used for rearranging discontinuous image data in the main scanning direction, continuous data in the main scanning direction after the image processing can be realized in the external memory.

Next, a fourth exemplary embodiment of the present invention will be described. Alphanumeric characters same as those in the configurations of the first to the third exemplary embodiments are applied to the parts which are in common with the first to the third exemplary embodiments and detailed descriptions will be omitted.

Figure 24:
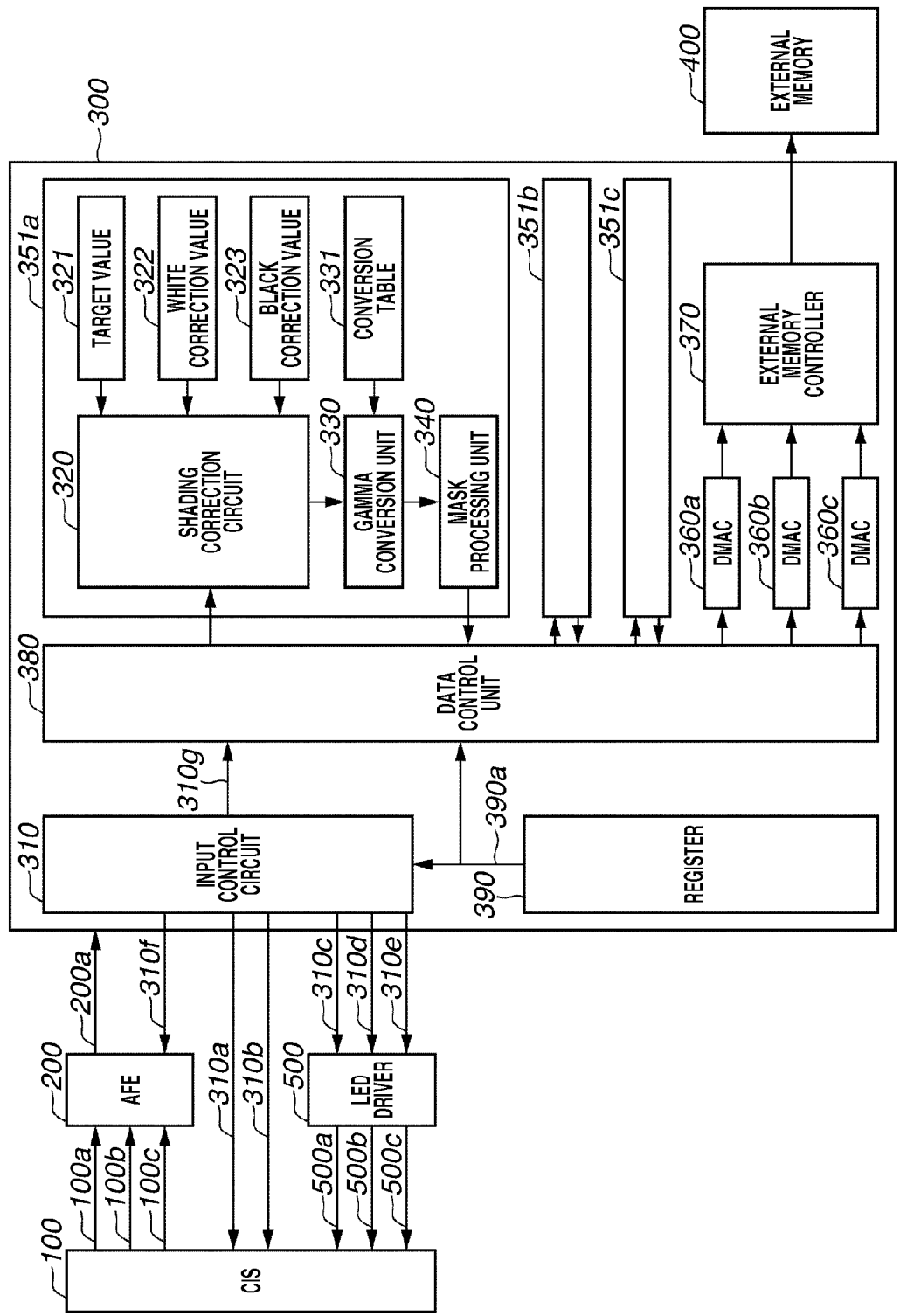
FIG. 24 is a block diagram illustrating a configuration of the reading apparatus.

FIG. 24 illustrates a configuration of the reading apparatus according to the fourth exemplary embodiment. The difference between the reading apparatus in FIG. 10 is that processing units 351a, 351b, and 351c, which include the processing units (i.e., the shading correction unit, the gamma conversion unit, and the mask processing unit) that perform the image processing, are provided. Each of the processing units is provided for each color component. In other words, the processing unit 351a performs image processing of the R component, the processing unit 351b performs image processing of the G component, and the processing unit 351c performs image processing of the B component.

Although the processing units 351a, 351b, and 351c have different alphanumeric characters according to the color component of the processing object for easier description, their inner configurations are the same. In other words, their calculation units used for the image processing, target values, white correction values, black correction values, and memories for storing the conversion table have a same configuration. Thus, a control unit (not shown) sets the correction values and the conversion table according to the color components that are processed and changes the color component.

The differences between the configuration of the processing unit 351 and the configuration of each of the image processing units and the memory for storing the correction values illustrated in FIG. 10 are that the processing unit 351 includes an image processing unit (calculation unit) and a correction value for one color component instead of an image processing unit (calculation unit) and a correction value for three color components. Conceptually, the image processing units and the correction value storage state in FIG. 10 are divided into three in FIG. 24.

Further, according to the second exemplary embodiment, the data control unit 380 acquires the various correction values (the target value, the white correction value, and the black correction value) which is sent to the shading correction circuit 320. However, in FIG. 24, the shading correction circuit 320 acquires each correction value. Thus, according to the fourth exemplary embodiment, the counter configuration for acquiring each correction value according to the first exemplary embodiment is included in the shading correction circuit 320.

According to the fourth exemplary embodiment, the color information identification signal 312a input in the data control unit 380 is not transmitted to each image processing unit. As described above, the processing unit 351 includes image processing units for each color component.

Thus, if the color information identification signal 312a added to the image data output by the input control circuit 310 indicates the R component, the data control unit 380 outputs the input image data to the processing unit for the R component, in other words, the processing unit 351a. Data added to the output image data is the effectiveness identification signal and the sensor attribute identification signal 318a.

The processing unit 351a performs image processing of the image data sent from the data control unit 380 based on the effectiveness identification signal and the sensor attribute identification signal 318a. The image-processed image data is sent to the data control unit 380 together with the effectiveness identification signal, whose latency regarding image processing is controlled, and the sensor attribute identification signal 318a. Since the configuration of the processing according to the value of the sensor attribute identification signal 318a is similar to that of the first exemplary embodiment, its description is omitted.

The data control unit 380 refers to the sensor attribute identification signal 318a sent from the processing unit 351a and packs the image-processed image data which is input in DMAC transfer units. The data control unit 380 sends the packed image data to the DMAC (DMAC 360a, DMAC 360b, or DMAC 360c) that matches the sensor channel. Since the operations of each DMAC and the external memory controller 370 are similar to those of the second exemplary embodiment, their descriptions are omitted.

According to the fourth exemplary embodiment, according to the color information identification signal 312a added to the image data that is input, the data control unit 380 sends the image data to the processing unit configured for each color component in the subsequent stage. Thus, the color information identification signal 312a is not transmitted to the stages subsequent to the data control unit 380, so that a simple configuration can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-091895 filed Apr. 6, 2009, which is hereby incorporated by reference herein in its entirety.

What is claimed is:

1. An apparatus comprising:
a storage unit;
a reading unit including a plurality of reading channels corresponding to a plurality of reading areas in a main scanning line direction;
a plurality of transfer units corresponding to the plurality of reading channels;
an input unit configured to input a plurality of pixel data read by the reading unit;
an addition unit configured to add, to each of the plurality of pixel data input by the input unit, first information indicating a reading channel which has read the pixel data;
an output unit configured to output each of the plurality of pixel data, to which the first information has been added; and
a control unit configured to transmit each of the plurality of pixel data output by the output unit, to one of the plurality of transfer units corresponding to the first information added to each of the plurality of pixel data,
wherein each of the plurality of transfer units transfers the plurality of pixel data transmitted by the control unit, to a storage position of the storage unit corresponding to each of the plurality of transfer units.

2. The apparatus according to claim 1, wherein the first information is information of data of the signal, read from one of a plurality of photoelectric conversion elements included in the plurality of image reading units, as a source of the pixel data.

3. The apparatus according to claim 1, wherein the first information is information of data of the signal, read from one of the plurality of image reading units, as a source of the pixel data.

4. The apparatus according to claim 1, further comprising an identification unit configured to identify effective pixel data out of the plurality of pixel data.

5. The apparatus according to claim 1, wherein the transfer unit packs the plurality of pixels data into blocks of a predetermined number of pixels, and transfers the plurality of pixel data using the packed predetermined number of pixels as a transfer block.

6. The apparatus according to claim 1, wherein the image processing includes at least one of shading correction, gamma conversion, and resolution conversion.

7. The apparatus according to claim 1, wherein reading unit is a contact image sensor (CIS).

8. A method for controlling an apparatus including a plurality of image reading units, the method comprising:
inputting a plurality of pixel data read by a reading unit;
adding, to each of the plurality of pixel data input by the inputting, first information indicating a reading channel which has read the pixel data;
outputting each of the plurality of pixel data, to which the first information has been added;

transmitting each of the plurality of pixel data output by the output unit, to one of the plurality of transfer units corresponding to the first information added to each of the plurality of pixel data; and transferring the plurality of pixel data transmitted by the transmitting to a storage position of a storage unit corresponding to each of a plurality of transfer units, wherein the plurality of transfer units corresponds to the plurality of reading channels, wherein the plurality of reading units correspond to a plurality of reading areas in a main scanning line direction, and wherein the plurality of light sources correspond to a plurality of colors.

9. The method according to claim 8, wherein the first information is information of data of the signal, read from one of a plurality of photoelectric conversion elements included in the plurality of image reading units, as a source of the pixel data.

10. The method according to claim 8, wherein the first information is information of data of the signal, read from one of the plurality of image reading units, as a source of the pixel data.

11. The method according to claim 8, further comprising:
identifying effective pixel data out of the plurality of pixel data.

12. The method according to claim 8, further comprising packing the plurality of pixels data into blocks of a predetermined number of pixels, and transferring the plurality of pixel data using the packed predetermined number of pixels as a transfer block.

13. The method according to claim 8, wherein the image processing includes at least one of shading correction, gamma conversion, and resolution conversion.

14. The method according to claim 8, wherein the reading unit is a contact image sensor (CIS).

15. A non-transitory computer readable storage medium storing a computer-executable program of instructions for causing a computer to perform a method comprising:

inputting a plurality of pixel data read by a reading unit;

adding, to each of the plurality of pixel data input by the inputting, first information indicating a reading channel which has read the pixel data;

outputting each of the plurality of pixel data, to which the first information has been added;

transmitting each of the plurality of pixel data output by the output unit, to one of the plurality of transfer units corresponding to the first information added to each of the plurality of pixel data; and transferring the plurality of pixel data transmitted by the transmitting to a storage position of a storage unit corresponding to each of a plurality of transfer units, wherein the plurality of transfer units corresponding to the plurality of reading channels, wherein the plurality of reading units correspond to a plurality of reading areas in a main scanning line direction, and wherein the plurality of light sources correspond to a plurality of colors.

16. The non-transitory computer readable storage medium according to claim 15, wherein the first information is information of data of the signal, read from one of a plurality of photoelectric conversion elements included in the plurality of image reading units, as a source of the pixel data.

17. The non-transitory computer readable storage medium according to claim 15, wherein the first information is information of data of the signal, read from one of the plurality of image reading units, as a source of the pixel data.

18. The non-transitory computer readable storage medium according to claim 15, further comprising:
identifying effective pixel data out of the plurality of pixel data.

19. The non-transitory computer readable storage medium according to claim 15, further comprising packing the plurality of pixels data into blocks of a predetermined number of pixels, and transferring the plurality of pixel data using the packed predetermined number of pixels as a transfer block.

20. The non-transitory computer readable storage medium according to claim 15, wherein the image processing includes at least one of shading correction, gamma conversion, and resolution conversion.

* * * * *